(12) United States Patent
Dong et al.

(10) Patent No.: US 12,022,441 B2
(45) Date of Patent: Jun. 25, 2024

(54) COMMUNICATIONS METHOD AND APPARATUS

(71) Applicant: HUAWEI TECHNOLOGIES CO., LTD., Guangdong (CN)

(72) Inventors: Lei Dong, Shanghai (CN); Jinfang Zhang, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 17/535,280

(22) Filed: Nov. 24, 2021

(65) Prior Publication Data

US 2022/0086807 A1 Mar. 17, 2022

Related U.S. Application Data

(63) Continuation of application No. PCT/CN2020/083841, filed on Apr. 8, 2020.

(30) Foreign Application Priority Data

May 29, 2019 (CN) .......................... 201910458744.0

(51) Int. Cl.
*H04W 72/02* (2009.01)
*H04L 1/08* (2006.01)
(Continued)

(52) U.S. Cl.
CPC ............... *H04W 72/02* (2013.01); *H04L 1/08* (2013.01); *H04W 72/0446* (2013.01);
(Continued)

(58) Field of Classification Search
CPC ............. H04W 72/02; H04W 72/0446; H04W 72/0453; H04W 72/20; H04W 72/56;
(Continued)

(56) References Cited

U.S. PATENT DOCUMENTS

| 2018/0063825 A1 | 3/2018 | Van Phan et al. |
| 2018/0279096 A1 | 9/2018 | Wu et al. |

(Continued)

FOREIGN PATENT DOCUMENTS

| CN | 107710854 A | 2/2018 |
| CN | 108024266 A | 5/2018 |

(Continued)

OTHER PUBLICATIONS

Extended European Search Report issued in European Application No. 20814814.8 on Jun. 9, 2022, 10 pages.

(Continued)

*Primary Examiner* — Thai Nguyen
(74) *Attorney, Agent, or Firm* — Fish & Richardson P.C.

(57) ABSTRACT

This application may be applied to an internet of vehicles, for example, V2X and LTE-V. A first terminal apparatus determines, a first resource pool. The first terminal apparatus detects control information of a second terminal apparatus, where the control information indicates second service data of the second terminal apparatus, and the control information includes location information of the second terminal apparatus, a first frequency domain resource, and a periodicity of the second service data. The first terminal apparatus determines an unavailable time-frequency resource in the first resource pool based on location information of the first terminal apparatus, the location information of the second terminal apparatus, a first threshold, the first frequency domain resource, and the periodicity of the second service data. The first terminal apparatus selects a first time-frequency resource from available time-frequency resources in the first resource pool to transmit first service data.

20 Claims, 6 Drawing Sheets

(51) Int. Cl.
 *H04W 72/0446* (2023.01)
 *H04W 72/0453* (2023.01)
 *H04W 72/20* (2023.01)
 *H04W 72/56* (2023.01)

(52) U.S. Cl.
 CPC ....... *H04W 72/0453* (2013.01); *H04W 72/20* (2023.01); *H04W 72/56* (2023.01)

(58) Field of Classification Search
 CPC ....... H04W 4/40; H04W 72/23; H04W 72/51; H04W 72/542; H04W 76/14; H04W 92/18; H04W 72/569; H04W 56/002; H04W 8/005; H04W 88/04; H04L 1/08; H04L 5/0048; H04L 1/1861; H04L 5/0053; H04L 1/1854
 See application file for complete search history.

(56) References Cited

U.S. PATENT DOCUMENTS

| | | | | |
|---|---|---|---|---|
| 2019/0116586 A1* | 4/2019 | Basu Mallick | ....... | H04W 64/00 |
| 2020/0092685 A1* | 3/2020 | Fehrenbach | .......... | H04W 76/27 |
| 2020/0280961 A1 | 9/2020 | Lee et al. | | |

FOREIGN PATENT DOCUMENTS

| | | | | |
|---|---|---|---|---|
| CN | 108809603 A | 11/2018 | | |
| CN | 109803400 A | 5/2019 | | |
| EP | 3628131 B1 * | 11/2023 | ........ | H04W 36/0009 |
| WO | 2018058676 A1 | 4/2018 | | |
| WO | 2018174661 A1 | 9/2018 | | |
| WO | 2019066629 A1 | 4/2019 | | |

OTHER PUBLICATIONS

Office Action issued in Chinese Application No. 201910458744.0 on Jun. 9, 2021, 21 pages (with English translation).
PCT International Search Report and Written Opinion issued in International Application No. PCT/CN2020/083841 on Jun. 29, 2020, 13 pages (with English translation).
Qualcomm Incorporated, "Sidelink Resource Allocation Mechanism for NR V2X," 3GPP TSG RAN WG1 Meeting #96, R1-1903345, Athens, Greece, Feb. 25-Mar. 1, 2019, 12 pages.

* cited by examiner

Network device

COMMUNICATIONS METHOD AND APPARATUS

CROSS-REFERENCE TO RELATED APPLICATIONS

This application is a continuation of International Application No. PCT/CN20201083841, filed on Apr. 8, 2020, which claims priority to Chinese Patent Application No. 201910458744.0, filed on May 29, 2019. The disclosures of the aforementioned applications are hereby incorporated by reference in their entireties.

TECHNICAL FIELD

This application relates to the field of communications technologies, and in particular, to a communications method and apparatus.

BACKGROUND

In long term evolution (long term evolution, LTE) vehicle-to-everything (vehicle-to-everything, V2X), there are two transmission modes (modes). One is a base station allocation mode, which is defined as mode 3 in the LTE standard, and the other is a user selection mode, which is defined as mode 4 in the LTE standard.

The user selection mode is mainly applied to V2X communication in a situation in which there is no network coverage. Because there is no unified resource management of a network device, a V2X terminal device can only independently select a resource from a resource pool to send data. In the user selection mode, a plurality of V2X terminal devices may all select resources from a same resource pool. Currently, the V2X terminal devices select resources in a manner based on historical listening information, to reduce a probability of a resource collision between the V2X terminal devices. In this manner, the V2X terminal device may continuously listen on a resource pool. For example, when the V2X terminal device needs to select a resource to send data 1, the V2X terminal device may determine, based on historical information, whether a potential available resource is occupied by another terminal device, and determine whether the resource is used by the V2X terminal device to transmit other data. If the V2X terminal device determines that the resource is not occupied by another V2X terminal device, and the resource is not occupied by other data transmitted by the V2X terminal device, the V2X terminal device may select the resource to send the data 1.

It can be learned from the foregoing descriptions that the V2X terminal device needs to exclude, from the resource pool, a resource occupied by the another V2X terminal device and a resource occupied by the other data transmitted by the V2X terminal device. Currently, when excluding the resource occupied by the another V2X terminal device, the V2X terminal device excludes, based on reference signal received power (reference signal received power, RSRP), a resource occupied by a V2X terminal device whose RSRP value obtained through measurement is greater than a threshold.

However, an exclusion result may not be accurate based on the RSRP value, resulting in a high resource collision probability.

SUMMARY

Embodiments of this application provide a communications method and apparatus, to reduce a resource collision probability.

According to a first aspect, a communications method is provided. The method includes: A first terminal apparatus determines a first resource pool, where a time-frequency resource in the first resource pool is available for transmitting at least one of sidelink service data, sidelink control information, and sidelink feedback information. The first terminal apparatus detects control information of a second terminal apparatus, where the control information of the second terminal apparatus is used to indicate second service data of the second terminal apparatus, and the control information of the second terminal apparatus includes location information of the second terminal apparatus, a first frequency domain resource occupied by the second service data, and a periodicity of the second service data. The first terminal apparatus determines an unavailable time-frequency resource in the first resource pool based on location information of the first terminal apparatus, the location information of the second terminal apparatus, a first threshold, the first frequency domain resource, and the periodicity of the second service data. The first terminal apparatus selects a first time-frequency resource from available time-frequency resources in the first resource pool to transmit first service data, where the available time-frequency resource includes a time-frequency resource remaining when the unavailable time-frequency resource is removed from the first resource pool. The first terminal apparatus sends the first service data on the first time-frequency resource.

The method may be performed by a first communications apparatus. The first communications apparatus may be a communications device or a communications apparatus that can support functions required by the communications device to implement the method, for example, a chip system. For example, the first communications apparatus is the first terminal apparatus. For example, the first terminal apparatus is a terminal device, is a chip system that is disposed in the terminal device and that is configured to implement functions of the terminal device, or is another component configured to implement functions of the terminal device.

In this embodiment of this application, the unavailable time-frequency resource excluded by the first terminal apparatus may include a time-frequency resource determined based on location information of the first terminal apparatus and location information of another terminal apparatus. To be specific, in this embodiment of this application, the unavailable time-frequency resource may be excluded directly based on locations of the terminal apparatuses. Screening is performed based on the locations, so that a case in which some time-frequency resources that need to be excluded are not excluded can be avoided as much as possible, to reduce a resource collision probability.

With reference to the first aspect, in a possible implementation of the first aspect, that the first terminal apparatus determines an unavailable time-frequency resource in the first resource pool based on location information of the first terminal apparatus, the location information of the second terminal apparatus, and the periodicity of the second service data includes: The first terminal apparatus determines a distance between the first terminal apparatus and the second terminal apparatus based on the location information of the first terminal apparatus and the location information of the second terminal apparatus. The first terminal apparatus determines that the distance between the first terminal apparatus and the second terminal apparatus is less than or equal to the first threshold, or that the distance between the first terminal apparatus and the second terminal apparatus is less than or equal to the first threshold, and reference signal received power obtained by the first terminal apparatus through measurement based on the control information is greater than a second threshold, where the control information indicates a resource location of a reference signal corresponding to the reference signal received power. The first terminal apparatus determines the unavailable time-frequency resource based on the periodicity of the second service data and the first frequency domain resource.

The first terminal apparatus may determine the unavailable time-frequency resource based on only the distance between the first terminal apparatus and the second terminal apparatus, or may determine the unavailable time-frequency resource based on the distance between the first terminal apparatus and the second terminal apparatus and the reference signal received power corresponding to the second terminal apparatus. This manner is flexible. In addition, if the first terminal apparatus determines the unavailable time-frequency resource based on the distance between the first terminal apparatus and the second terminal apparatus and the reference signal received power corresponding to the second terminal apparatus, accuracy of the determined unavailable time-frequency resource may be further increased.

With reference to the first aspect, in a possible implementation of the first aspect, that the first terminal apparatus detects control information of a second terminal apparatus includes: The first terminal apparatus detects the control information of the second terminal apparatus within first duration before a time point at which the first service data arrives.

For example, within the first duration before the first service data arrives, the first terminal apparatus may continuously detect control information from another terminal apparatus. For example, after detecting the control information, the first terminal apparatus may perform an operation such as decoding, and may store some processing results of the control information. In this way, after the first service data arrives, the first terminal apparatus may determine the unavailable time-frequency resource based on a previous detection result. Alternatively, within the first duration before the first service data arrives, the first terminal apparatus may continuously detect control information from another terminal apparatus, and if the first terminal apparatus detects the control information, the first terminal apparatus may store the control information. When the first service data arrives, the first terminal apparatus may perform processing such as decoding on the stored control information, and determine the unavailable time-frequency resource based on a processing result of the control information.

With reference to the first aspect, in a possible implementation of the first aspect, the method further includes: The first terminal apparatus determines that the first threshold is a predefined value. Alternatively, the first terminal apparatus, receives first signaling from a network device, where the first signaling is used to indicate the first threshold.

The first threshold may be a predefined value, for example, a value predefined in a protocol, or may be a value configured by the network device. This is not specifically limited.

With reference to the first aspect, in a possible implementation of the first aspect, the control information includes a priority of the second service data. The method further includes: The first terminal apparatus determines the first threshold based on a priority of the first service data and the priority of the second service data.

Alternatively, the first threshold may be determined based on the priority of the first service data and the priority of the second service data. The first terminal apparatus may know the priority of the first service data, and the priority of the second service data may be obtained, for example, by using the control information. A manner of determining the first threshold is not limited in this embodiment of this application.

With reference to the first aspect, in a possible implementation of the first aspect, that the first terminal apparatus determines the first threshold based on a priority of the first service data and the priority of the second service data includes: The first terminal apparatus determines a number h based on the priority of the first service data and the priority of the second service data. The first terminal apparatus determines, based on a first correspondence, that a threshold corresponding to the number h is the first threshold, where the first correspondence is a correspondence between a number and a threshold.

A manner of determining the first threshold based on the priority of the first service data and the priority of the second service data is provided herein. Certainly, this manner of determining the first threshold is merely an example, and does not constitute a limitation on the technical solutions in the embodiments of this application.

With reference to the first aspect, in a possible implementation of the first aspect, the first correspondence is configured by using signaling; or the first correspondence is predefined.

For example, the first correspondence may be carried in signaling, and the signaling is, for example, RRC signaling from the network device, or may be other signaling. The first terminal apparatus may determine the number h, and then may determine the first threshold based on the first correspondence carried in the signaling. This manner is flexible. Alternatively, the first correspondence may be predefined, for example, may be predefined in a protocol. In this case, after determining the number h, the first terminal apparatus may determine the first threshold based on the predefined first correspondence. In this manner, the network device does not need to send the first correspondence to the first terminal apparatus. This helps reduce signaling overheads.

With reference to the first aspect, in a possible implementation of the first aspect, that the first terminal apparatus determines, based on a first correspondence, that a threshold corresponding to the number h is the first threshold includes: The first terminal apparatus determines, based on retransmission information, the first threshold from two thresholds corresponding to the number h, where the retransmission information includes whether the first service data is retransmitted data, and the two thresholds corresponding to the number h include a third threshold and a fourth threshold. When the retransmission information includes that the first service data is the retransmitted data, the first terminal apparatus determines that the third threshold is the first threshold, or when the retransmission information includes that the first service data is newly transmitted data, the first terminal apparatus determines that the fourth threshold is the first threshold, where the third threshold is less than the fourth threshold.

When the first threshold is determined, whether the first service data is the retransmitted data may be further considered, so that more time-frequency resources can be further provided for more important data (for example, the retransmitted data) for transmission. For example, if the first service data is the retransmitted data, the first terminal apparatus considers that a transmission priority of the first service data is higher, and the first terminal apparatus may select a smaller threshold from the two values indicated by the number h as the first threshold $Th'_{prioTX,prioRX,Re_{TX},Re_{RX}}$. A smaller first threshold indicates a smaller quantity of to-be-excluded time-frequency resources, and therefore sufficient time-frequency resources can be reserved for selection by the first terminal apparatus to send the first service data. If the first service data is the newly transmitted data, the first terminal apparatus may select a larger threshold as the first threshold, to reserve more time-frequency resources for the second terminal apparatus.

With reference to the first aspect, in a possible implementation of the first aspect, that the first terminal apparatus determines, based on a first correspondence, that a threshold corresponding to the number h is the first threshold includes: The first terminal apparatus determines, based on retransmission information, that one of four thresholds corresponding to the number h in the first correspondence is the first threshold, where the retransmission information includes whether the first service data is retransmitted data and whether the second service data is retransmitted data.

With reference to the first aspect, in a possible implementation of the first aspect, that the first terminal apparatus determines, based on retransmission information, that one of four thresholds corresponding to the number h in the first correspondence is the first threshold includes: If the retransmission information includes that the first service data is the retransmitted data and the second service data is newly transmitted data, the first terminal apparatus determines that a third threshold in two thresholds corresponding to the number h in the first correspondence is the first threshold; if the retransmission information includes that the first service data is the retransmitted data and the second service data is the retransmitted data, the first terminal apparatus determines that a fourth threshold in two thresholds corresponding to the number h in the first correspondence is the first threshold; if the retransmission information includes that the first service data is newly transmitted data and the second service data is newly transmitted data, the first terminal apparatus determines that a fifth threshold in two thresholds corresponding to the number h in the first correspondence is the first threshold; or if the retransmission information includes that the first service data is newly transmitted data and the second service data is the retransmitted data, the first terminal apparatus determines that a sixth threshold in two thresholds corresponding to the number h in the first correspondence is the first threshold, where a value relationship between the third threshold, the fourth threshold, the fifth threshold, and the sixth threshold is: the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold.

When the first threshold is determined, both whether the first service data is the retransmitted data and whether the second service data is the retransmitted data may be considered, so that more time-frequency resources can be further provided for more important data (for example, the retransmitted data) for transmission, and the determined first threshold is more accurate. Based on whether the first service data is the retransmitted data and whether the second service data is the retransmitted data, combinations of two of the four states may correspond to four thresholds: the third threshold, the fourth threshold, the fifth threshold, and the sixth threshold. In different cases, the first threshold may be set to a different threshold in the four thresholds, to meet an actual data transmission requirement.

With reference to the first aspect, in a possible implementation of the first aspect, the control information includes the priority of the second service data. The method further includes: The first terminal apparatus determines the second threshold based on the priority of the first service data and the priority of the second service data.

The second threshold may be a predefined value, for example, a value predefined in a protocol, may be configured by the network device, or may be determined based on the priority of the first service data and the priority of the second service data. This is not specifically limited.

With reference to the first aspect, in a possible implementation of the first aspect, that the first terminal apparatus determines the second threshold based on the priority of the first service data and the priority of the second service data includes: The first terminal apparatus determines a number i based on the priority of the first service data and the priority of the second service data. The first terminal apparatus determines, based on a second correspondence, that a threshold corresponding to the number i is the second threshold, where the second correspondence is a correspondence between a number and a threshold.

A manner of determining the second threshold based on the priority of the first service data and the priority of the second service data is provided herein. Certainly, this manner of determining the second threshold is merely an example, and does not constitute a limitation on the technical solutions in the embodiments of this application.

With reference to the first aspect, in a possible implementation of the first aspect, the second correspondence is configured by using signaling; or the second correspondence is predefined.

For example, the second correspondence may be carried in signaling, and the signaling is, for example, RRC signaling from the network device, or may be other signaling. The first terminal apparatus may determine the number i, and then may determine the second threshold based on the second correspondence carried in the signaling. This manner is flexible. Alternatively, the second correspondence may be predefined, for example, may be predefined in a protocol. In this case, after determining the number i, the first terminal apparatus may determine the second threshold based on the predefined second correspondence. In this manner, the network device does not need to send the second correspondence to the first terminal apparatus. This helps reduce signaling overheads.

With reference to the first aspect, in a possible implementation of the first aspect, that the first terminal apparatus determines, based on a second correspondence, that a threshold corresponding to the number i is the second threshold includes: The first terminal apparatus determines, based on the retransmission information, the second threshold from two thresholds corresponding to the number i, where the retransmission information includes whether the first service data is the retransmitted data, and the two thresholds corresponding to the number h include a seventh threshold and an eighth threshold. When the retransmission information includes that the first service data is the retransmitted data, the first terminal apparatus determines that the seventh threshold is the second threshold, or when the retransmission information includes that the first service data is the newly transmitted data, the first terminal apparatus determines that the eighth threshold is the second threshold, where the seventh threshold is greater than the eighth threshold.

When the second threshold is determined, whether the first service data is the retransmitted data may be considered, so that more time-frequency resources can be further provided for more important data (for example, the retransmitted data) for transmission. For example, if the first service data is the retransmitted data, the first terminal apparatus considers that a transmission priority of the first service data is higher, and the first terminal apparatus may select a larger threshold from the two values indicated by the number i as the second threshold. A larger second threshold indicates a smaller quantity of to-be-excluded time-frequency resources, and therefore sufficient time-frequency resources can be reserved for selection by the first terminal apparatus to send the first service data. If the first service data is the newly transmitted data, the first terminal apparatus may select a smaller threshold as the second threshold, to reserve more time-frequency resources for the second terminal apparatus.

With reference to the first aspect, in a possible implementation of the first aspect, that the first terminal apparatus determines, based on a second correspondence, that a threshold corresponding to the number i is the second threshold includes: The first terminal apparatus determines, based on the retransmission information, that one of four thresholds corresponding to the number i in the second correspondence is the second threshold, where the retransmission information includes whether the first service data is the retransmitted data.

With reference to the first aspect, in a possible implementation of the first aspect, that the first terminal apparatus determines, based on the retransmission information, that one of four thresholds corresponding to the number i in the second correspondence is the second threshold includes: if the retransmission information includes that the first service data is the retransmitted data and the second service data is the newly transmitted data, the first terminal apparatus determines that a seventh threshold in two thresholds corresponding to the number i in the first correspondence is the first threshold; if the retransmission information includes that the first service data is the retransmitted data and the second service data is the retransmitted data, the first terminal apparatus determines that an eighth threshold in two thresholds corresponding to the number i in the first correspondence is the second threshold; if the retransmission information includes that the first service data is the newly transmitted data and the second service data is the newly transmitted data, the first terminal apparatus determines that a ninth threshold in two thresholds corresponding to the number i in the first correspondence is the second threshold; or if the retransmission information includes that the first service data is the newly transmitted data and the second service data is the retransmitted data, the first terminal apparatus determines that a tenth threshold in two thresholds corresponding to the number i in the first correspondence is the second threshold, where a value relationship between the seventh threshold, the eighth threshold, the ninth threshold, and the tenth threshold is: the seventh threshold>the eighth threshold>the ninth threshold>the tenth threshold, the seventh threshold=the eighth threshold>the ninth threshold>the tenth threshold, or the seventh threshold>the eighth threshold>the ninth threshold=the tenth threshold.

When the second threshold is determined, both whether the first service data is the retransmitted data and whether the second service data is the retransmitted data may be considered, so that more time-frequency resources can be further provided for more important data (for example, the retransmitted data) for transmission, and the determined second threshold is more accurate. Based on whether the first service data is the retransmitted data and whether the second service data is the retransmitted data, combinations of two of the four states may correspond to four thresholds: the third threshold, the fourth threshold, the fifth threshold, and the sixth threshold. In different cases, the second threshold may be set to a different threshold in the four thresholds, to meet an actual data transmission requirement.

With reference to the first aspect, in a possible implementation of the first aspect, that the first terminal apparatus determines the unavailable time-frequency resource based on the periodicity of the second service data and the first frequency domain resource includes: The first terminal apparatus determines a first time unit set based on the periodicity of the second service data, where a time unit in the first time unit set is a time unit on a to-be-excluded resource, and the time unit is a symbol or a slot. The first terminal apparatus determines that a time-frequency resource including the first time unit set and the first frequency domain resource is the unavailable time-frequency resource, where a time unit y in the first time unit set satisfies the following formula:

$$y + j \times [S_{symbol} \times P_{rsvp\_TX}/N_{symbol}] = m + q[S_{symbol} \times P_{rsvp\_RX}/N_{symbol}],$$

where
m represents a number of a first time unit in time units included in the first resource pool, and the first time unit is a time unit in which the first terminal apparatus receives the control information; j=0, 1, 2, . . . , and $C_{resel}-1$, and $C_{resel}$ represents a quantity of periods included in a time-frequency resource reserved by the first terminal apparatus for the first service data; $P_{rsvp\_TX}$ represents a periodicity of the first service data; $N_{symbol}$ represents a quantity of time units included in one frame structure configuration period; $S_{symbol}$ represents a quantity of time units that are available for transmitting sidelink service data in one frame structure period; $P_{rsvp\_RX}$ represents the periodicity of the second service data; and q=1, 2, . . . , and Q, where if $$\left(\frac{P_{rsvp_{RX}}}{N_{symbol}}\right)/K < 1 \text{ and } n' - m \leq [S_{symbol} \times P_{rsvp\_RX}/N_{symbol}],$$

$$Q = K/\left[\frac{P_{rsvp_{RX}}}{N_{symbol}}\right]; \text{ otherwise, } Q = 1,$$

where K is a preconfigured value, or is a value indicated by using higher layer signaling; [ ] represents rounding up or rounding down; and if a second time unit belongs to the first resource pool, n' is a number of the second time unit in the first resource pool, or if a second time unit does not belong to the first resource pool, n' is a number of a $1^{st}$ time unit that belongs to the first resource pool after the second time unit, where the second time unit is a time unit in which the first service data arrives.

The foregoing formula is merely a specific example of determining the unavailable time-frequency resource. In actual application, a manner of determining the unavailable time-frequency resource is not limited thereto. In addition, a manner of determining the unavailable time-frequency resource after the formula is transformed also falls within the protection scope of the embodiments of this application.

With reference to the first aspect, in a possible implementation of the first aspect, the unavailable time-frequency resource further includes a time-frequency resource reserved by the first terminal apparatus for third service data sent by the first terminal apparatus, and a sending time of the third service data is within the first duration before the time point at which the first service data arrives.

When the terminal device excludes the unavailable time-frequency resource in the first resource pool, the terminal device needs to exclude a time-frequency resource occupied by another terminal device, and also needs to exclude a time-frequency resource occupied by the terminal device for sending another service data.

According to a second aspect, a communications apparatus is provided. For example, the communications apparatus is the first terminal apparatus described above. The first terminal apparatus is configured to perform the method according to any one of the first aspect or the possible implementations of the first aspect. Specifically, the first terminal apparatus may include modules configured to perform the method according to any one of the first aspect or the possible implementations of the first aspect, for example, include a processing module and a transceiver module. For example, the first terminal apparatus is a communications device. For example, the communications device is a terminal device.

The processing module is configured to determine a first resource pool, where a time-frequency resource in the first resource pool is available for transmitting at least one of sidelink service data, sidelink control information, and sidelink feedback information.

The transceiver module is configured to detect control information of a second terminal apparatus, where the control information of the second terminal apparatus is used to indicate second service data of the second terminal apparatus, and the control information of the second terminal apparatus includes location information of the second terminal apparatus, a first frequency domain resource occupied by the second service data, and a periodicity of the second service data.

The processing module is further configured to determine an unavailable time-frequency resource in the first resource pool based on location information of the first terminal apparatus, the location information of the second terminal apparatus, a first threshold, the first frequency domain resource, and the periodicity of the second service data.

The processing module is further configured to select a first time-frequency resource from available time-frequency resources in the first resource pool to transmit first service data, where the available time-frequency resource includes a time-frequency resource remaining when the unavailable time-frequency resource is removed from the first resource pool.

The transceiver module is further configured to send the first service data on the first time-frequency resource.

With reference to the second aspect, in a possible implementation of the second aspect, the processing module is configured to determine the unavailable time-frequency resource in the first resource pool based on the location information of the first terminal apparatus, the location information of the second terminal apparatus, the first frequency domain resource, and the periodicity of the second service data in the following manners:
determining a distance between the first terminal apparatus and the second terminal apparatus based on the location information of the terminal apparatus and the location information of the second terminal apparatus;
determining that the distance between the first terminal apparatus and the second terminal apparatus is less than or equal to the first threshold, or that the distance between the first terminal apparatus and the second terminal apparatus is less than or equal to the first threshold, and reference signal received power obtained by the first terminal apparatus through measurement based on the control information is greater than a second threshold, where the control information indicates a resource location of a reference signal corresponding to the reference signal received power; and
determining the unavailable time-frequency resource based on the periodicity of the second service data and the first frequency domain resource.

With reference to the second aspect, in a possible implementation of the second aspect, that the transceiver module is configured to detect control information of a second terminal apparatus includes:
detect the control information of the second terminal apparatus within first duration before a time point at which the first service data arrives.

With reference to the second aspect, in a possible implementation of the second aspect,
the processing module is further configured to determine that the first threshold is a predefined value; or
the transceiver module is further configured to receive first signaling from a network device, where the first signaling is used to indicate the first threshold.

With reference to the second aspect, in a possible implementation of the second aspect, the control information includes a priority of the second service data; and the processing module is further configured to determine the first threshold based on a priority of the first service data and the priority of the second service data.

With reference to the second aspect, in a possible implementation of the second aspect, the processing module is further configured to determine the first threshold based on the priority of the first service data and the priority of the second service data in the following manners:
determining a number h based on the priority of the first service data and the priority of the second service data; and
determining, based on a first correspondence, that a threshold corresponding to the number h is the first threshold, where the first correspondence is a correspondence between a number and a threshold.

With reference to the second aspect, in a possible implementation of the second aspect,
the first correspondence is configured by using signaling; or
the first correspondence is predefined.

With reference to the second aspect, in a possible implementation of the second aspect, the processing module is configured to determine, based on the first correspondence in the following manners, that the threshold corresponding to the number h is the first threshold:
determining, based on retransmission information, the first threshold from two thresholds corresponding to the number h, where the retransmission information includes whether the first service data is retransmitted data, and the two thresholds corresponding to the number h include a third threshold and a fourth threshold; and
when the retransmission information includes that the first service data is the retransmitted data, determining that the third threshold is the first threshold, or when the retransmission information includes that the first service data is newly transmitted data, determining that the fourth threshold is the first threshold, where the third threshold is less than the fourth threshold.

With reference to the second aspect, in a possible implementation of the second aspect, the processing module is configured to determine, based on the first correspondence in the following manner, that the threshold corresponding to the number h is the first threshold:

determining, based on retransmission information, that one of four thresholds corresponding to the number h in the first correspondence is the first threshold, where the retransmission information includes whether the first service data is retransmitted data and whether the second service data is retransmitted data.

With reference to the second aspect, in a possible implementation of the second aspect, the processing module is configured to determine, based on the retransmission information in the following manners, that one of the four thresholds corresponding to the number h in the first correspondence is the first threshold:

if the retransmission information includes that the first service data is the retransmitted data and the second service data is newly transmitted data, determining that a third threshold in two thresholds corresponding to the number h in the first correspondence is the first threshold;

if the retransmission information includes that the first service data is the retransmitted data and the second service data is the retransmitted data, determining that a fourth threshold in two thresholds corresponding to the number h in the first correspondence is the first threshold;

if the retransmission information includes that the first service data is newly transmitted data and the second service data is newly transmitted data, determining that a fifth threshold in two thresholds corresponding to the number h in the first correspondence is the first threshold; or if the retransmission information includes that the first service data is newly transmitted data and the second service data is the retransmitted data, determining that a sixth threshold in two thresholds corresponding to the number h in the first correspondence is the first threshold, where a value relationship between the third threshold, the fourth threshold, the fifth threshold, and the sixth threshold is: the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold.

With reference to the second aspect, in a possible implementation of the second aspect, the control information includes the priority of the second service data; and the processing module is further configured to determine the second threshold based on the priority of the first service data and the priority of the second service data.

With reference to the second aspect, in a possible implementation of the second aspect, the processing module is configured to determine the second threshold based on the priority of the first service data and the priority of the second service data in the following manners:

determining a number i based on the priority of the first service data and the priority of the second service data; and determining, based on a second correspondence, that a threshold corresponding to the number i is the second threshold, where the second correspondence is a correspondence between a number and a threshold.

With reference to the second aspect, in a possible implementation of the second aspect, the second correspondence is configured by using signaling; or the second correspondence is predefined.

With reference to the second aspect, in a possible implementation of the second aspect, the processing module is configured to determine, based on the second correspondence in the following manners, that the threshold corresponding to the number i is the second threshold:

determining, based on the retransmission information, the second threshold from two thresholds corresponding to the number i, where the retransmission information includes whether the first service data is the retransmitted data, and the two thresholds corresponding to the number h include a seventh threshold and an eighth threshold; and when the retransmission information includes that the first service data is the retransmitted data, determining that the seventh threshold is the second threshold, or when the retransmission information includes that the first service data is the newly transmitted data, determining that the eighth threshold is the second threshold, where the seventh threshold is greater than the eighth threshold.

With reference to the second aspect, in a possible implementation of the second aspect, the processing module is configured to determine, based on the second correspondence in the following manner, that the threshold corresponding to the number i is the second threshold:

determining, based on the retransmission information, that one of four thresholds corresponding to the number i in the second correspondence is the second threshold, where the retransmission information includes whether the first service data is the retransmitted data.

With reference to the second aspect, in a possible implementation of the second aspect, the processing module is configured to determine, based on the retransmission information in the following manners, that one of the four thresholds corresponding to the number i in the second correspondence is the second threshold:

if the retransmission information includes that the first service data is the retransmitted data and the second service data is the newly transmitted data, determining that a seventh threshold in two thresholds corresponding to the number i in the first correspondence is the first threshold;

if the retransmission information includes that the first service data is the retransmitted data and the second service data is the retransmitted data, determining that an eighth threshold in two thresholds corresponding to the number i in the first correspondence is the second threshold;

if the retransmission information includes that the first service data is the newly transmitted data and the second service data is the newly transmitted data, determining that a ninth threshold in two thresholds corresponding to the number i in the first correspondence is the second threshold; or if the retransmission information includes that the first service data is the newly transmitted data and the second service data is the retransmitted data, determining that a tenth threshold in two thresholds corresponding to the number i in the first correspondence is the second threshold, where a value relationship between the seventh threshold, the eighth threshold, the ninth threshold, and the tenth threshold is: the seventh threshold>the eighth threshold>the ninth threshold>the tenth threshold, the seventh threshold=the eighth threshold>the ninth threshold>the tenth threshold, or the seventh threshold>the eighth threshold>the ninth threshold=the tenth threshold.

With reference to the second aspect, in a possible implementation of the second aspect, the processing module is configured to determine the unavailable time-frequency resource based on the periodicity of the second service data and the first frequency domain resource in the following manners:

determining a first time unit set based on the periodicity of the second service data, where a time unit in the first time unit set is a time unit on a to-be-excluded resource, and the time unit is a symbol or a slot; and determining that a time-frequency resource including the first time unit set and the first frequency domain resource is the unavailable time-frequency resource, where a time unit y in the first time unit set satisfies the following formula:

$$y + j \times [S_{symbol} \times P_{rsvp\_TX}/N_{symbol}] = m + q[S_{symbol} \times P_{rxvp\_RX}/N_{symbol}],$$

where m represents a number of a first time unit in time units included in the first resource pool, and the first time unit is a time unit in which the terminal apparatus receives the control information; j=0, 1, 2, ..., and $C_{resel}-1$, and $C_{resel}$ represents a quantity of periods included in a time-frequency resource reserved by the terminal apparatus for the first service data, where in this case, the terminal apparatus reserves a periodic time-frequency resource for the first service data, and $C_{resel}$ represents a quantity of periods specifically included in the periodic time-frequency resource, for example, if the terminal apparatus reserves resources in 10 periods, the time-frequency resource includes the 10 periods, that is, $C_{resel}$=10; $P_{rsvp\_TX}$ represents a periodicity of the first service data; $N_{symbol}$ represents a quantity of time units included in one frame structure configuration period; $S_{symbol}$ represents a quantity of time units that are available for transmitting sidelink service data in one frame structure period; $P_{rxvp\_RX}$ represents the periodicity of the second service data; and q=1, 2, ..., and Q, where if $$\left(\frac{P_{rxvp_{RX}}}{N_{symbol}}\right)/K < 1 \text{ and } n' - m \le [S_{symbol} \times P_{rxvp\_RX}/N_{symbol}],$$

$$Q = K/\left[\frac{P_{rxvp_{RX}}}{N_{symbol}}\right]; \text{ otherwise, } Q = 1,$$

where K is a preconfigured value, or is a value indicated by using higher layer signaling; [ ] represents rounding up or rounding down; and if a second time unit belongs to the first resource pool, n' is a number of the second time unit in the first resource pool, or if a second time unit does not belong to the first resource pool, n' is a number of a $1^{st}$ time unit that belongs to the first resource pool after the second time unit, where the second time unit is a time unit in which the first service data arrives.

With reference to the second aspect, in a possible implementation of the second aspect, the unavailable time-frequency resource further includes a time-frequency resource reserved by the first terminal apparatus for third service data sent by the first terminal apparatus, and a sending time of the third service data is within the first duration before the time point at which the first service data arrives.

For technical effects brought by the second aspect or the possible implementations of the second aspect, refer to the descriptions of the technical effects brought by the first aspect or the corresponding implementations of the first aspect.

According to a third aspect, a communications apparatus is provided. For example, the communications apparatus is the first terminal apparatus described above. The communications apparatus includes a processor and a transceiver. The processor and the transceiver are coupled to each other, and are configured to implement the method according to the first aspect or the possible designs of the first aspect. For example, the communications apparatus is a chip disposed in a communications device. For example, the communications device is a terminal device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information through the radio frequency transceiver component.

The processor is configured to determine a first resource pool, where a time-frequency resource in the first resource pool is available for transmitting at least one of sidelink service data, sidelink control information, and sidelink feedback information.

The transceiver is configured to detect control information of a second terminal apparatus, where the control information of the second terminal apparatus is used to indicate second service data of the second terminal apparatus, and the control information of the second terminal apparatus includes location information of the second terminal apparatus, a first frequency domain resource occupied by the second service data, and a periodicity of the second service data.

The processor is further configured to determine an unavailable time-frequency resource in the first resource pool based on location information of the first terminal apparatus, the location information of the second terminal apparatus, a first threshold, the first frequency domain resource, and the periodicity of the second service data.

The processor is further configured to select a first time-frequency resource from available time-frequency resources in the first resource pool to transmit first service data, where the available time-frequency resource includes a time-frequency resource remaining when the unavailable time-frequency resource is removed from the first resource pool.

The transceiver is further configured to send the first service data on the first time-frequency resource.

With reference to the third aspect, in a possible implementation of the third aspect, the processor is configured to determine the unavailable time-frequency resource in the first resource pool based on the location information of the first terminal apparatus, the location information of the second terminal apparatus, the first frequency domain resource, and the periodicity of the second service data in the following manners:

determining a distance between the first terminal apparatus and the second terminal apparatus based on the location information of the terminal apparatus and the location information of the second terminal apparatus;

determining that the distance between the first terminal apparatus and the second terminal apparatus is less than or equal to the first threshold, or that the distance between the first terminal apparatus and the second terminal apparatus is less than or equal to the first threshold, and reference signal received power obtained by the first terminal apparatus through measurement based on the control information is greater than a second threshold, where the control information indicates a resource location of a reference signal corresponding to the reference signal received power; and determining the unavailable time-frequency resource based on the periodicity of the second service data and the first frequency domain resource.

With reference to the third aspect, in a possible implementation of the third aspect, that the transceiver detects control information of a second terminal apparatus includes:

detecting the control information of the second terminal apparatus within first duration before a time point at which the first service data arrives.

With reference to the third aspect, in a possible implementation of the third aspect, the processor is further configured to determine that the first threshold is a predefined value; or the transceiver is further configured to receive first signaling from a network device, where the first signaling is used to indicate the first threshold.

With reference to the third aspect, in a possible implementation of the third aspect, the control information includes a priority of the second service data; and the processor is further configured to determine the first threshold based on a priority of the first service data and the priority of the second service data.

With reference to the third aspect, in a possible implementation of the third aspect, the processor is further configured to determine the first threshold based on the priority of the first service data and the priority of the second service data in the following manners:

determining a number h based on the priority of the first service data and the priority of the second service data; and determining, based on a first correspondence, that a threshold corresponding to the number h is the first threshold, where the first correspondence is a correspondence between a number and a threshold.

With reference to the third aspect, in a possible implementation of the third aspect, the first correspondence is configured by using signaling; or the first correspondence is predefined.

With reference to the third aspect, in a possible implementation of the third aspect, the processor is configured to determine, based on the first correspondence in the following manners, that the threshold corresponding to the number h is the first threshold:

determining, based on retransmission information, the first threshold from two thresholds corresponding to the number h, where the retransmission information includes whether the first service data is retransmitted data, and the two thresholds corresponding to the number h include a third threshold and a fourth threshold; and when the retransmission information includes that the first service data is the retransmitted data, determining that the third threshold is the first threshold, or when the retransmission information includes that the first service data is newly transmitted data, determining that the fourth threshold is the first threshold, where the third threshold is less than the fourth threshold.

With reference to the third aspect, in a possible implementation of the third aspect, the processor is configured to determine, based on the first correspondence in the following manner, that the threshold corresponding to the number h is the first threshold:

determining, based on retransmission information, that one of four thresholds corresponding to the number h in the first correspondence is the first threshold, where the retransmission information includes whether the first service data is retransmitted data and whether the second service data is retransmitted data.

With reference to the third aspect, in a possible implementation of the third aspect, the processor is configured to determine, based on the retransmission information in the following manners, that one of the four thresholds corresponding to the number h in the first correspondence is the first threshold:

if the retransmission information includes that the first service data is the retransmitted data and the second service data is newly transmitted data, determining that a third threshold in two thresholds corresponding to the number h in the first correspondence is the first threshold;

if the retransmission information includes that the first service data is the retransmitted data and the second service data is the retransmitted data, determining that a fourth threshold in two thresholds corresponding to the number h in the first correspondence is the first threshold;

if the retransmission information includes that the first service data is newly transmitted data and the second service data is newly transmitted data, determining that a fifth threshold in two thresholds corresponding to the number h in the first correspondence is the first threshold; or if the retransmission information includes that the first service data is newly transmitted data and the second service data is the retransmitted data, determining that a sixth threshold in two thresholds corresponding to the number h in the first correspondence is the first threshold, where a value relationship between the third threshold, the fourth threshold, the fifth threshold, and the sixth threshold is: the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold.

With reference to the third aspect, in a possible implementation of the third aspect, the control information includes the priority of the second service data; and the processor is further configured to determine the second threshold based on the priority of the first service data and the priority of the second service data.

With reference to the third aspect, in a possible implementation of the third aspect, the processor is configured to determine the second threshold based on the priority of the first service data and the priority of the second service data in the following manners:

determining a number i based on the priority of the first service data and the priority of the second service data; and determining, based on a second correspondence, that a threshold corresponding to the number i is the second threshold, where the second correspondence is a correspondence between a number and a threshold.

With reference to the third aspect, in a possible implementation of the third aspect, the second correspondence is configured by using signaling; or the second correspondence is predefined.

With reference to the third aspect, in a possible implementation of the third aspect, the processor is configured to determine, based on the second correspondence in the following manners, that the threshold corresponding to the number i is the second threshold:

determining, based on the retransmission information, the second threshold from two thresholds corresponding to the number i, where the retransmission information includes whether the first service data is the retransmitted data, and the two thresholds corresponding to the number h include a seventh threshold and an eighth threshold; and when the retransmission information includes that the first service data is the retransmitted data, determining that the seventh threshold is the second threshold, or when the retransmission information includes that the first service data is the newly transmitted data, determining that the eighth threshold is the second threshold, where the seventh threshold is greater than the eighth threshold.

With reference to the third aspect, in a possible implementation of the third aspect, the processor is configured to determine, based on the second correspondence in the following manner, that the threshold corresponding to the number i is the second threshold:

determining, based on the retransmission information, that one of four thresholds corresponding to the number i in the second correspondence is the second threshold, where the retransmission information includes whether the first service data is the retransmitted data.

With reference to the third aspect, in a possible implementation of the third aspect, the processor is configured to determine, based on the retransmission information in the following manners, that one of the four thresholds corresponding to the number i in the second correspondence is the second threshold:

if the retransmission information includes that the first service data is the retransmitted data and the second service data is the newly transmitted data, determining that a seventh threshold in two thresholds corresponding to the number i in the first correspondence is the first threshold;

if the retransmission information includes that the first service data is the retransmitted data and the second service data is the retransmitted data, determining that an eighth threshold in two thresholds corresponding to the number i in the first correspondence is the second threshold;

if the retransmission information includes that the first service data is the newly transmitted data and the second service data is the newly transmitted data, determining that a ninth threshold in two thresholds corresponding to the number i in the first correspondence is the second threshold; or if the retransmission information includes that the first service data is the newly transmitted data and the second service data is the retransmitted data, determining that a tenth threshold in two thresholds corresponding to the number i in the first correspondence is the second threshold, where a value relationship between the seventh threshold, the eighth threshold, the ninth threshold, and the tenth threshold is: the seventh threshold>the eighth threshold>the ninth threshold>the tenth threshold, the seventh threshold=the eighth threshold>the ninth threshold>the tenth threshold, or the seventh threshold>the eighth threshold>the ninth threshold=the tenth threshold.

With reference to the third aspect, in a possible implementation of the third aspect, the processor is configured to determine the unavailable time-frequency resource based on the periodicity of the second service data and the first frequency domain resource in the following manners:

determining a first time unit set based on the periodicity of the second service data, where a time unit in the first time unit set is a time unit on a to-be-excluded resource, and the time unit is a symbol or a slot; and determining that a time-frequency resource including the first time unit set and the first frequency domain resource is the unavailable time-frequency resource, where a time unit y in the first time unit set satisfies the following formula:

$$y + j \times [S_{symbol} \times P_{rsvp\_TX}/N_{symbol}] = m + q[S_{symbol} \times P_{rxvp\_RX}/N_{symbol}],$$

where m represents a number of a first time unit in time units included in the first resource pool, and the first time unit is a time unit in which the terminal apparatus receives the control information; $j=0, 1, 2, \ldots,$ and $C_{resel}-1$, and $C_{resel}$ represents a quantity of periods included in a time-frequency resource reserved by the terminal apparatus for the first service data, that is, a quantity of periods included in the reserved period resource; $P_{rsvp\_TX}$ represents a periodicity of the first service data; $N_{symbol}$ represents a quantity of time units included in one frame structure configuration period; $S_{symbol}$ represents a quantity of time units that are available for transmitting sidelink service data in one frame structure period; $P_{rxvp\_RX}$ represents the periodicity of the second service data; and $q=1, 2, \ldots,$ and Q, where if $$\left(\frac{P_{rxvp_{RX}}}{N_{symbol}}\right)/K < 1 \text{ and } n' - m \leq [S_{symbol} \times P_{rxvp\_RX}/N_{symbol}],$$

$$Q = K/\left[\frac{P_{rxvp_{RX}}}{N_{symbol}}\right]; \text{ otherwise, } Q = 1,$$

where K is a preconfigured value, or is a value indicated by using higher layer signaling; [ ] represents rounding up or rounding down; and if a second time unit belongs to the first resource pool, n' is a number of the second time unit in the first resource pool, or if a second time unit does not belong to the first resource pool, n' is a number of a $1^{st}$ time unit that belongs to the first resource pool after the second time unit, where the second time unit is a time unit in which the first service data arrives.

With reference to the third aspect, in a possible implementation of the third aspect, the unavailable time-frequency resource further includes a time-frequency resource reserved by the first terminal apparatus for third service data sent by the first terminal apparatus, and a sending time of the third service data is within the first duration before the time point at which the first service data arrives.

For technical effects brought by the third aspect or the possible implementations of the third aspect, refer to the descriptions of the technical effects brought by the first aspect or the corresponding implementations of the first aspect.

According to a fourth aspect, a communications apparatus is provided. The communications apparatus may be the first terminal apparatus in the foregoing method designs. For example, the communications apparatus is a chip disposed in a communications device. For example, the communications device is a terminal device. The communications apparatus includes: a memory, configured to store computer-executable program code; and a processor, where the processor is coupled to the memory. The program code stored in the memory includes instructions. When the processor executes the instructions, the communications apparatus is enabled to perform the method according to any one of the first aspect or the possible implementations of the first aspect.

The communications apparatus may further include a communications interface. The communications interface may be a transceiver in the terminal device, for example, implemented by using an antenna, a feeder, a codec, and the like in the communications apparatus. Alternatively, if a third communications apparatus is the chip disposed in the terminal device, the communications interface may be an input/output interface in the chip, for example, an input/output pin.

According to a fifth aspect, a computer-readable storage medium is provided. The computer readable storage medium stores instructions, and when the instructions are run on a computer, the computer is enabled to perform the method according to any one of the first aspect or the possible designs of the first aspect.

According to a sixth aspect, a computer program product including instructions is provided. The computer program product stores the instructions, and when the computer program product runs on a computer, the computer is enabled to perform the method according to any one of the first aspect or the possible designs of the first aspect.

In the embodiments of this application, the unavailable time-frequency resource may be excluded directly based on locations of the terminal apparatuses. Screening is performed based on the locations, so that a case in which some time-frequency resources that need to be excluded are not excluded can be avoided as much as possible, to reduce a resource collision probability.

DESCRIPTION OF EMBODIMENTS

Figure 1:
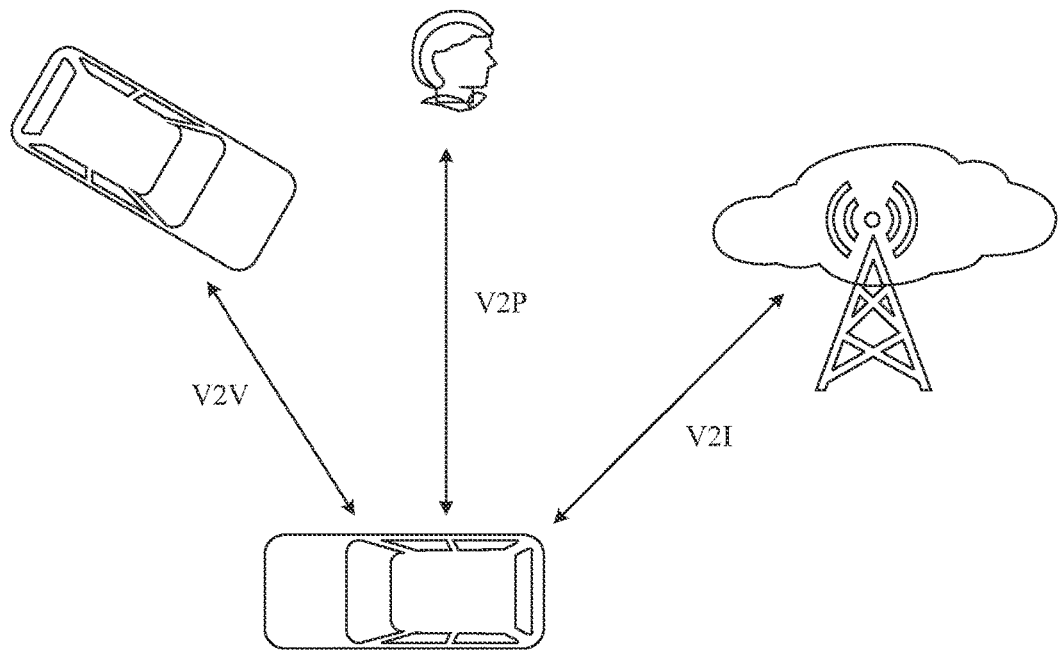
FIG. 1 is a schematic diagram of several cases of V2X.

To make the objectives, technical solutions, and advantages of embodiments of this application clearer, the following further describes the embodiments of this application in detail with reference to the accompanying drawings.

The following describes some terms in the embodiments of this application, to facilitate understanding for a person skilled in the art.

(1) Terminal device: The terminal device includes a device that provides a user with voice and/or data connectivity, for example, may include a handheld device with a wireless connection function or a processing device connected to a wireless modem. The terminal device may communicate with a core network through a radio access network (radio access network, RAN), and exchange a voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a mobile (mobile) console, a remote station (remote station), an access point (access point, AP), a remote terminal (remote terminal) device, an access terminal (access terminal) device, a user terminal (user terminal) device, a user agent (user agent), a user device (user device), or the like. For example, the terminal device may include a mobile phone (or referred to as a "cellular" phone), a computer with a mobile terminal device, a portable, pocket-sized, handheld, computer built-in, or in-vehicle mobile apparatus, or an intelligent wearable device. For example, the terminal device is a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device having low power consumption, a device having a limited storage capability, or a device having a limited computing capability. For example, the terminal device includes an information sensing device, for example, a barcode, a radio frequency identification (radio frequency identification, RFID) device, a sensor, a global positioning system (global positioning system, GPS), or a laser scanner. The terminal device in the embodiments of this application may alternatively be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement methods in the embodiments of this application.

As an example instead of a limitation, the terminal device in the embodiments of this application may alternatively be a wearable device. The wearable device may also be referred to as a wearable intelligent device, and is a general term for wearable devices, such as glasses, gloves, watches, clothes, and shoes, that are developed by applying wearable technologies in intelligent designs of daily wear. The wearable device is a portable device that is directly worn on a body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) Network device: For example, the network device includes an access network (access network, AN) device, for example, a base station (for example, an access point), and may be a device that communicates with a wireless terminal device over an air interface by using one or more cells in an access network. Alternatively, for example, a network device in a V2X technology is a road side unit (road side unit, RSU). The base station may be configured to mutually convert a received over-the-air frame and an internet protocol (IP) packet, and serve as a router between the terminal device and a remaining portion of the access network, where the remaining portion of the access network may include an IP network. The RSU may be a fixed infrastructure entity that supports a vehicle-to-everything (vehicle-to-everything, V2X) application, and may exchange a message with another entity that supports the V2X application. The access network device may further coordinate attribute management of the air interface. For example, the access network device may include an evolved NodeB (NodeB, eNB, or eNodeB, evolved NodeB) in an LTE system or a long term evolution-advanced (long term evolution-advanced, LTE-A) system, may include a next generation NodeB (next generation NodeB, gNB) in a 5th generation (5th generation, 5G) mobile communications technology new radio (new radio, NR) system, or may include a centralized unit (centralized unit, CU) and a distributed unit (distributed unit, DU) in a cloud radio access network (cloud radio access network, Cloud RAN) system. This is not limited in the embodiments of this application.

Certainly, the network device may further include a core network device. However, the technical solutions provided in the embodiments of this application mainly relate to the access network device. Therefore, unless otherwise specified, a "network device" described below is an access network device.

(3) V2X: In Release (Rel)-14/15/16, V2X is successfully initiated as a major application in a device-to-device (device-to-device, D2D) technology. Based on an existing D2D technology, a specific application requirement of V2X is optimized in V2X, to further reduce an access latency of a V2X device and resolve a resource conflict.

As shown in FIG. 1, V2X specifically further includes application requirements such as vehicle-to-vehicle (vehicle-to-vehicle, V2V), vehicle-to-infrastructure (vehicle-to-infrastructure, V2I), vehicle-to-pedestrian (vehicle-to-pedestrian, V2P) direct communication, and vehicle-to-network (vehicle-to-network, V2N) communication interaction. V2V refers to communication between vehicles. V2P refers to communication between a vehicle and a person (including a pedestrian, a cyclist, a driver, or a passenger). V2I refers to communication between a vehicle and a network device, for example, an RSU. In addition, V2N may be included in V2I, and V2N refers to communication between a vehicle and a base station/network.

The RSU includes two types: a terminal-type MU and a base station-type RSU. Because the terminal-type RSU is deployed on a road side, the terminal-type RSU is in a non-mobile state, and mobility does not need to be considered. The base station-type RSU can provide timing synchronization and resource scheduling for a vehicle that communicates with the base station-type RSU.

(4) Terms: The terms "system" and "network" may be used interchangeably in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or similar expressions indicate any combination of the following, including any combination of one or more of the following. For example, at least one of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first identifier and a second identifier are merely used to distinguish between different identifiers, but do not indicate different content, priorities, importance, or the like of the two identifiers.

The foregoing describes some concepts in the embodiments of this application. The following describes technical features in the embodiments of this application.

With development of wireless communications technologies, people have increasing requirements for a high data rate and user experience, and have increasing requirements for a proximity service for knowing and communicating with surrounding people or things. Therefore, a device-to-device (device-to-device, D2D) technology emerges. Application of the D2D technology can lighten load of a cellular network, reduce battery power consumption of user equipment, improve a data rate, and better meet a requirement for a proximity service. The D2D technology allows a plurality of terminal devices that support a D2D function to perform direct discovery and direct communication regardless of whether there is a network infrastructure. In view of features and advantages of the D2D technology, an internet of vehicles application scenario based on the D2D technology is proposed. However, considering security, a latency requirement is extremely high in this scenario, and cannot be implemented by using the existing D2D technology.

Therefore, in a network of an LTE technology proposed in the 3rd generation partnership project (3rd generation partnership project, 3GPP), a V2X internet of vehicles technology is proposed. V2X communication is vehicle-to-everything communication, and includes V2V, V2P, V2I, and V2N.

The V2X communication is intended for high-speed devices such as vehicles, and is a basic and key technology applied to a scenario in which there is an extremely high requirement for a communication latency in the future. For example, the scenario may be an intelligent vehicle, autonomous driving, or an intelligent transportation system. The LTE V2X communication may support a communication scenario in which there is network coverage and a communication scenario in which there is no network coverage, and a resource allocation manner of the LTE V2X communication may be a network access device scheduling mode, for example, an evolved universal terrestrial radio access network NodeB (E-UTRAN NodeB, eNB) scheduling mode and a user selection mode. Based on a V2X technology, vehicle user equipment (vehicle LTE, V-UE) can periodically or aperiodically send some information, such as a location, a speed, and an intention (turning, paralleling, reversing, or the like), of the vehicle user equipment to surrounding V-UE. Similarly, V-UE also receives information from the surrounding V-UE in real time. The 3GPP standard organization officially published a first version the LTE V2X standard, that is, LTE Release (Release) 14 in early 2017.

LTE V2X meets some basic requirements in a V2X scenario. However, existing LTE V2X cannot effectively support an application scenario such as fully intelligent driving or autonomous driving in the future. With development of 5G NR technologies in the 3GPP standard organization, NR V2X further develops. For example, NR V2X can support a lower transmission latency, more reliable communication transmission, a higher throughput, and better user experience, to meet requirements of a wider range of application scenarios.

In LTE V2X, there are two transmission modes. One is a base station allocation mode, which is defined as mode 3 in the LTE standard, and the other is a user selection mode, which is defined as mode 4 in the LTE standard.

The base station allocation mode is mainly applied to V2X communication in a situation in which there is network coverage. A base station centrally allocates resources based on a reporting status of a buffer status report (buffer status report, BSR) of a terminal device. The base station may allocate the resources in a semi-persistent scheduling (semi-persistent scheduling, SPS) mode or a dynamic mode.

The user selection mode is mainly applied to V2X communication in a situation in which there is no network coverage. Because there is no unified resource management of a network device, a V2X terminal device can only independently select a resource from a resource pool configured by the network device to perform V2X communication. For example, for a cell, if the network device uniformly configures a resource pool, a plurality of V2X terminal devices in the cell select a resource from the resource pool. Currently, the V2X terminal devices select a resource in a manner based on historical listening information, to reduce a probability of a resource collision between the V2X terminal devices. In this manner, the V2X terminal device may continuously listen on a resource pool. For example, when the V2X terminal device needs to select a resource to send data 1, the V2X, terminal device may determine, based on historical information, whether a potential available resource is occupied by another terminal device, and determine whether the resource is used by the V2X terminal device to transmit other data. If the V2X terminal device determines that the resource is not occupied by another V2X terminal device, and the resource is not occupied by other data transmitted by the V2X terminal device, the V2X terminal device may select the resource to send the data 1.

Figure 2:
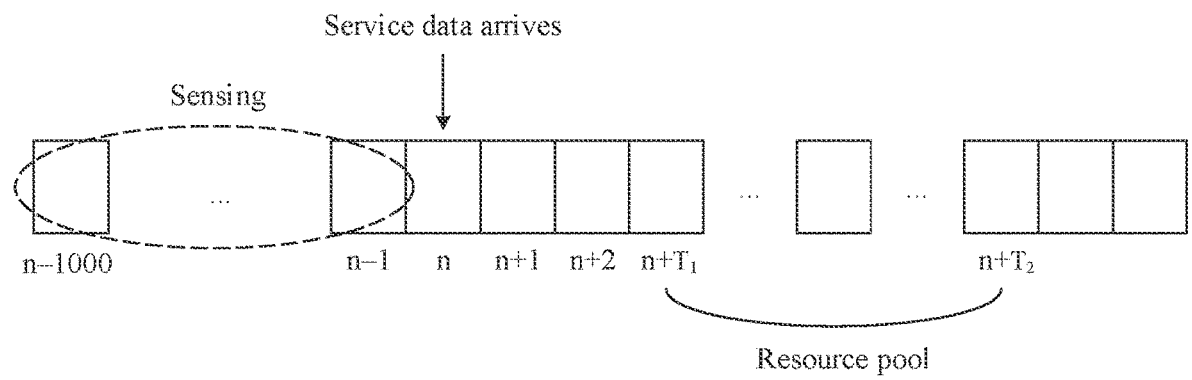
FIG. 2 is a schematic diagram of a resource selection process.

Specifically, in LTE mode 4, assuming that periodic service data of the V2X terminal device arrives in a subframe n, the V2X terminal device is configured at a higher layer of the V2X terminal device to start resource selection or resource reselection. Specifically, a resource selection process may be shown in FIG. 2.

If service data that needs to be transmitted by the V2X terminal device arrives in the subframe n, the V2X terminal device views historical listening information of $10 \times P_{step}$ subframes (from $n-10 \times P_{step}$ to $n-1$) before the subframe n, where $P_{step}$ represents a time length corresponding to the historical listening information. For a value of $P_{step}$, refer to Table 1. A subframe corresponding to a resource pool used by the V2X terminal device to select a resource is included in $[n+T_1, n+T_2]$. The V2X terminal device excludes an unavailable resource in the resource pool, and then selects an available resource from resources remaining when the unavailable resource is excluded from the resource pool to transmit the service data. In addition, because the service data is periodic, the V2X terminal device further needs to reserve, based on a periodicity of the service data, a resource used to transmit the service data. For example, the V2X terminal device may reserve one or more resources in one or more periods. Values of $T_1$ and $T_2$ may be configured by the network device. For example, generally, $T_1 \leq 4$, and $20 \leq T_2 \leq 100$. In addition, each available resource in the resource pool may be defined as $R_{x,y}$. Herein, y represents a subframe number, and x may represent a set of contiguous sub-channels whose length is $L_{subCH}$, or x may be represented as another frequency domain unit. Alternatively, it may be understood that x represents a frequency domain location of $R_{x,y}$, and y represents a time domain location of $R_{x,y}$.

TABLE 1

| Frame structure | $R_{x,y}$ | Quantity of subframes | | | | | | | | | |
|---|---|---|---|---|---|---|---|---|---|---|---|
| | | 0 | 1 | 2 | 3 | 4 | 5 | 6 | 7 | 8 | 9 |
| TDD configuration 0 | 60 | D | S | U | U | U | D | S | U | U | U |
| TDD configuration 1 | 40 | D | S | U | U | D | D | S | U | U | D |

TABLE 1-continued

| Frame structure | $R_{x,y}$ | Quantity of subframes | | | | | | | | | |
|---|---|---|---|---|---|---|---|---|---|---|---|
| | | 0 | 1 | 2 | 3 | 4 | 5 | 6 | 7 | 8 | 9 |
| TDD configuration 2 | 20 | D | S | U | D | D | D | S | U | D | D |
| TDD configuration 3 | 30 | D | S | U | U | U | D | D | D | D | D |
| TDD configuration 4 | 20 | D | S | U | U | D | D | D | D | D | D |
| TDD configuration 5 | 10 | D | S | U | D | D | D | D | D | D | D |
| TDD configuration 6 | 50 | D | S | U | U | U | D | S | U | U | D |
| FDD | 100 | D/U | D/U | D/U | D/U | D/U | D/U | D/U | D/U | D/U | D/U |

For example, time units that include all system frames in an LTE system form a fourth time unit set, and an element in the fourth time unit set is a subframe. Herein, [n+T$_1$, n+T$_2$] is a subset of subframes included in the fourth time unit set. A subframe $t_i^{SL}$ included in the fourth time unit set meet: $0 < t_i^{SL} < 10240$, where 10240 represents a total quantity of subframes in one system frame. In addition, a subframe that meets any one of the following conditions needs to be excluded from the fourth time unit set:

1. a subframe used to transmit a sidelink synchronization signal (sidelink synchronization signal, SLSS);
2. a downlink subframe and a special subframe in a time division duplex (time division duplex, TDD) mode; and
3. a reserved (reserved) subframe.

After the foregoing subframes are excluded from the subframes corresponding to the fourth time unit set, a final time unit set (including $t_0^{SL}, t_1^{SL}, \ldots,$ and $t_{T_{max}}^{SL}$) on a physical sidelink shared channel (physical sidelink shared channel, PSSCH) is obtained. For example, a resource pool to which the time unit set belongs is referred to as a fifth resource pool, and the fifth resource pool includes subframes remaining when the foregoing subframes are excluded from the fourth time unit set. The remaining subframes may be renumbered in the fifth resource pool, for example, may be consecutively numbered, and the remaining subframes are sorted in ascending order in the fifth resource pool.

A specific periodic resource reservation relationship is as follows:

When the V2X terminal device is in mode 4 in the LTE system, the V2X terminal device selects a resource from resources that belong to the fifth resource pool in [n+T$_1$, n+T$_2$]. If in a subframe $t_m^{SL}$, a V2X terminal device transmits a PSSCH by using a set of sub-channels after excluding an unavailable resource in the fifth resource pool, the V2X terminal device may transmit the PSSCH again by using the same set of sub-channels at a moment of a subframe $t_{m+j \times P'_{rsvp\_TX}}^{SL}$. To be specific, the V2X terminal device reserves a periodic resource to transmit the PSSCH. Herein, $j = 0, 1, 2, \ldots,$ and $C_{resel} - 1$ and $P'_{rsvp\_TX} = P_{step} \times P_{rsvp\_TX}/100$, where $P_{rsvp\_TX}$ represents a periodicity of service data carried on the PSSCH, $C_{resel}$ represents a quantity of periods in which resources are reserved in mode 4. For example, $C_{resel} = 10$ if the V2X terminal device reserves resources in 10 periods for the service data.

Figure 3:
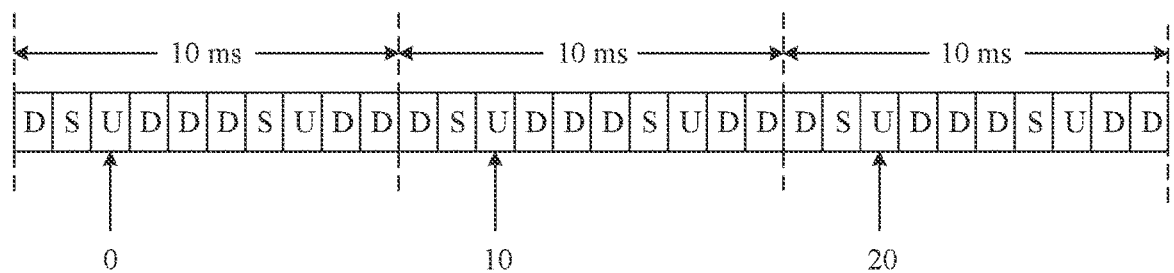
FIG. 3 is a schematic diagram of a periodic resource reservation relationship.

For example, when a frame structure is the TDD configuration 2, a quantity of uplink subframes is 2, and a value of $P_{step}$ is: $2 \times 10 = 20$. As shown in FIG. 3, m=1 assuming that the first transmission on the PSSCH is performed in a 1$^{st}$ uplink subframe of the first frame. For example, if the periodicity $P_{rsvp\_TX}$ of the service data is 20 ms, and j is set to 1, the second transmission on the PSSCH is performed in a 1$^{st}$ uplink subframe of the third frame.

Figure 4:
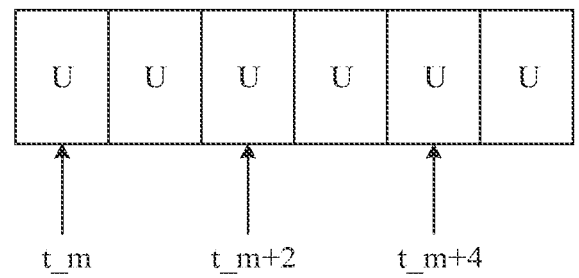
FIG. 4 is a schematic diagram of a resource pool used to transmit a PSSCH.

Based on definitions of the fifth resource pool, a downlink subframe, a special subframe, and a reserved subframe in a frame structure in FIG. 3 are excluded. For example, if a quantity of reserved subframes is 0, a time domain resource corresponding to a resource pool used to transmit a PSSCH is shown in FIG. 4. The resource pool used to transmit the PSSCH is a resource pool obtained after the unavailable resource in the fifth resource pool is excluded. For example, the resource pool is referred to as a sixth resource pool.

In FIG. 4, a subframe $t_m^{SL}$ (a subframe t_m in FIG. 4) corresponds to the 1$^{st}$ uplink subframe of the first frame, and a subframe $t_{m+4}^{SL}$ (a subframe t_m+4 in FIG. 4) corresponds to the 1$^{st}$ uplink subframe of the third frame. An interval between the two subframes in the fifth resource pool is: $P'_{rsvp\_TX} = P_{step} \times P_{rsvp\_TX}/100 = 20 \times 20/100 = 4$. A physical meaning of the interval is expressed as a product of a quantity of uplink subframes in a next system frame that are configured in a current frame structure and a quantity of system frames included in a period of a service.

As described above, the V2X terminal device needs to exclude the unavailable subframe from the fifth resource pool to obtain the sixth resource pool. The following describes how the V2X terminal device excludes the unavailable subframe from the fifth resource pool.

At a moment of a subframe $t_n^{SL}$, the V2X terminal device continuously monitors a subframe in $[t_{n'-10 \times P_{step}}^{SL}, t_{n'-10 \times P_{step}+1}^{SL}, \ldots,$ and $t_{n'-1}^{SL}]$ other than a subframe in which the V2X terminal device sends service data. If a subframe n belongs to the fifth resource pool, n' is a number of a subframe $t_{n'}^{SL}$ in the fifth resource pool. If a subframe n does not belong to the fifth resource pool, $t_{n'}^{SL}$ is a 1$^{st}$ subframe that belongs to the fifth resource pool after the subframe n.

When the V2X terminal device excludes the unavailable resource in the fifth resource pool, an exclusion principle is as follows:

1. The V2X terminal device excludes a resource occupied by other service data sent by the V2X terminal device.

If a resource $R_{x,y}$ in the fifth resource pool meets both Condition 1 and Condition 2, the resource $R_{x,y}$ needs to be excluded.

Condition 1: The V2X terminal device has sent service data on the resource $R_{x,z}$, where x represents a frequency domain location of the resource $R_{x,z}$, and z represents a time domain location of the resource $R_{x,z}$, for example, z represents a subframe $t_z^{SL}$.

Condition 2: If an integer j exists, and $y + j \times P'_{rsvp\_TX} = z + P_{step} \times q \times k$ is satisfied, the resource $R_{x,y}$ needs to be excluded.

For definitions of parameters such as j, $P'_{rsvp\_TX}$, and $P_{step}$, refer to the foregoing descriptions. Herein, k may be configured by a higher layer parameter restrict resource reservation period (restrict Resource Reservation Period), and the parameter is included, for example, in radio resource control (radio resource control, RRC) signaling; and q=1, 2, . . . , and Q. When k<1 and n'-z≤$P_{step}$×k, Q=1/k; otherwise, Q=1. Definitions of n' herein are as follows: If a subframe n belongs to the fifth resource pool, n' is a number of a subframe $t_{n'}^{SL}$ in the fifth resource pool; or if a subframe n does not belong to the fifth resource pool, $t_{n'}^{SL}$ is a $1^{st}$ subframe that belongs to the fifth resource pool after the subframe n.

For example, the V2X terminal device has sent service data 1 on the resource $R_{x,z}$, and the service data 1 may also be periodic. Therefore, in addition to sending the service data 1 on the resource $R_{x,z}$, the V2X terminal device further reserves a subsequent resource to send the service data 1. Therefore, this principle is to exclude the resource on which the V2X terminal device has sent the service data 1, and exclude the resource reserved for sending the service data 1. It can be learned that the excluded resource is the same as the resource on which the service data has been sent in frequency domain.

2. The V2X terminal device excludes a resource occupied by another V2X terminal device for sending service data.

If a resource $R_{x,y}$ in the fifth resource pool meets Condition 3, Condition 4, and Condition 5, the resource $R_{x,y}$ needs to be excluded.

Condition 3: The V2X terminal device receives, on a resource $R_{x,m}$, sidelink control information (sidelink control information, SCI) from the another V2X terminal device, and decodes the SCI, where x represents a frequency domain location of the resource $R_{x,m}$, and m represents a time domain location of the resource $R_{x,m}$, for example, m represents a subframe $t_m^{SL}$. A "resource reservation (resource reservation)" field in the SCI indicates a value of $P_{rsvp\_RX}$, and a "priority (priority)" field in the SCI indicates a value of prioRX, where $P_{rsvp\_RX}$ represents a periodicity of service data sent by the another V2X terminal device on the resource $R_{x,y}$, and prioRX represents a priority of the service data sent by the another V2X terminal device on the resource $R_{x,y}$.

Condition 4: The V2X terminal device measures the received SCI from the another V2X terminal device to obtain an RSRP value, where the RSRP value obtained through measurement is greater than a threshold $Th_{prioTX,prioRX}$.

Herein, $Th_{prioTX,prioRX}$ represents a value indicated by a number i in an SL-ThresPSSCH-RSRP field of higher layer signaling (for example, RRC signaling), and a specific calculation method for the number i is: i=prioTX×8+prioRX+1. A correspondence between a number and a threshold is: (−128+(i−1)×2), and is in a unit of dBm.

Condition 5: If an integer j satisfies a formula y+j× $P'_{rsvp\_TX}$=m+q×$P_{step}$×$P_{rsvp\_RX}$, the resource $R_{x,y}$ needs to be excluded. It can be learned that the excluded resource is the same as the resource on which the service data has been sent in frequency domain.

For definitions of parameters such as j, $P'_{rsvp\_TX}$, and $P_{step}$, refer to the foregoing descriptions. Herein, $P_{rsvp\_RX}$ may be indicated by a resource reservation field (resource reservation field) in an SCI format (format)-1. For definitions of $P_{rsvp\_RX}$, refer to Table 2. A value X of $P_{rsvp\_RX}$ is a value obtained by dividing a periodicity of service data by 100. When $P_{rsvp\_RX}$<1 and n'−m≤$P_{step}$×$P_{rsvp\_RX}$, Q=1/$P_{rsvp\_RX}$; otherwise, Q=1. Definitions of n' herein are as follows: If a subframe n belongs to the fifth resource pool, n' is a number of a subframe $t_{n'}^{SL}$ in the fifth resource pool; or if a subframe n does not belong to the fifth resource pool, $t_{n'}^{SL}$ is a $1^{st}$ subframe that belongs to the fifth resource pool after the subframe n.

The another V2X, terminal device needs to send service data. If the service data is periodic, the another V2X terminal device reserves a subframe to send the service data. Therefore, this principle is to exclude the resource reserved by the another V2X terminal device to send the service data. Certainly, an exclusion condition is that the RSRP value that is of the another V2X terminal device and that is obtained through measurement is greater than the threshold.

TABLE 2

| Resource reservation field | X |
| --- | --- |
| "0001", "0010", . . . , and "1010" | 1, 2, . . . , and 10 |
| "1011" | 0.5 |
| "1100" | 0.2 |
| "0000" | 0 |
| "1101", "1110", . . . , and "1111" | Reserved |

The left side of Table 2 represents information included in the resource reservation field. For example, the information included in the resource reservation field is "0001". In this case, the V2X terminal device may determine that a value X of $P_{rsvp\_RX}$ is equal to 1, and by analogy.

Figure 5:
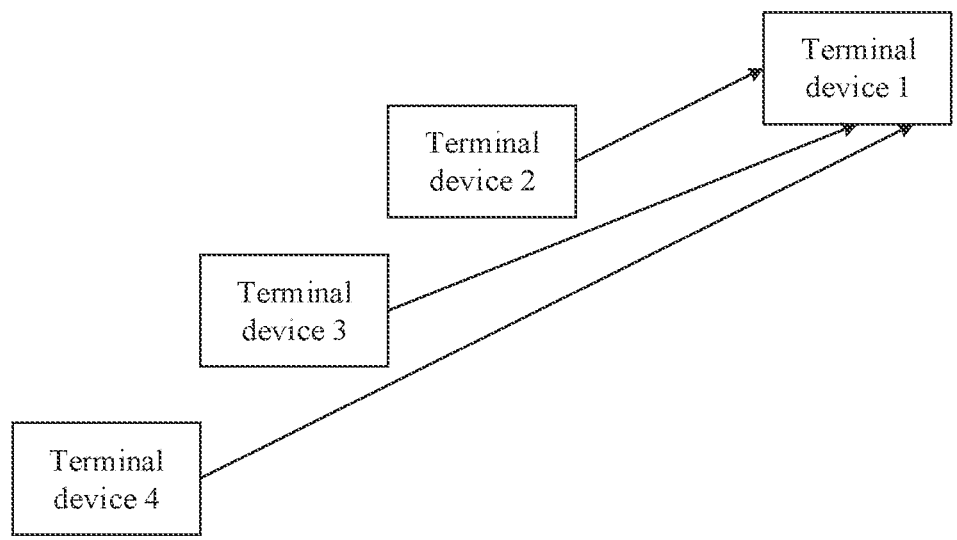
FIG. 5 is a schematic diagram in which a value relationship between RSRP obtained by terminal devices through measurement is related to a distance between the terminal devices.

It can be learned from the foregoing descriptions that, in the current resource exclusion principle 2, that the RSRP value obtained through measurement is greater than the threshold $Th_{prioTX,prioRX}$ is used as one of exclusion conditions. Usually, a smaller distance between two terminal devices indicates a larger RSRP value obtained by one terminal device by measuring a signal from the other terminal device. Refer to FIG. 5. For example, in FIG. 5, a terminal device 1 represents a V2X terminal device that performs measurement, and a terminal device 2, a terminal device 3, and a terminal device 4 represent three V2X terminal devices that send SCI to the terminal device 1. For example, the terminal device 1 needs to measure SCI from the terminal device 2 to obtain an RSRP value, that is, RSRP 2, measure SCI from the terminal device 3 to obtain an RSRP value, that is, RSRP 3, and measure SCI from the terminal device 4 to obtain an RSRP value, that is, RSRP 4. It may be inferred, based on a distance between the terminal device 1 and each of the terminal device 2, the terminal device 3, and the terminal device 4, that a value relationship between the RSRP 2, the RSRP 3, and the RSRP 4 may be: RSRP 2>RSRP 3>RSRP 4.

Figure 6A:
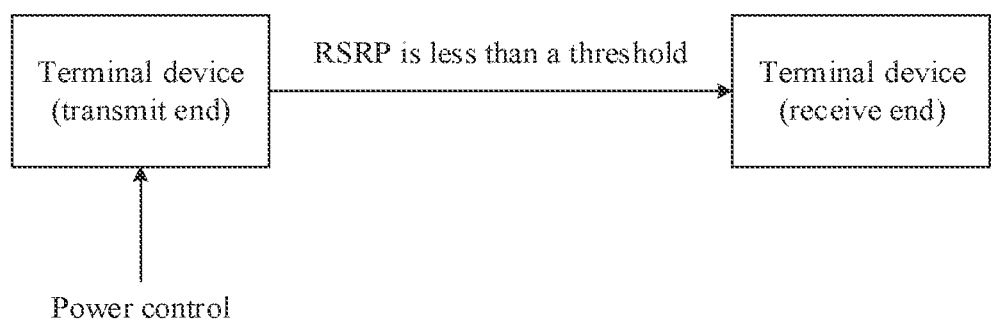
FIG. 6A is a schematic diagram of a scenario in which resource collision may occur.

Resource selection may be unreliable when RSRP is used as one of resource exclusion conditions due to factors such as power control, mobility, or congestion timeliness of a V2X terminal device at a transmit end. For example, refer to FIG. 6A. When a V2X terminal device at a transmit end uses power control, the V2X terminal device may send a signal at transmit power lower than maximum transmit power of the V2X terminal device. In this case, a V2X terminal device at a receive end measures the signal to obtain an RSRP value, where the obtained RSRP value may be less than the threshold $Th_{prioTX,prioRX}$. Therefore, a resource occupied by the V2X terminal device at the transmit end is not excluded by the V2X terminal device at the receive end. However, the V2X terminal device at the transmit end and the V2X terminal device at the receive end are actually close to each other, and in this case, the V2X terminal device at the receive end needs to exclude the resource occupied by the V2X terminal device at the transmit end. If the resource occupied by the V2X terminal device at the transmit end is not excluded, a resource collision may occur. For example, if the two V2X terminal devices choose to send data in a same subframe, because the two V2X terminal devices are close to each other, severe interference is caused, and transmission performance is reduced.

Figure 6B:
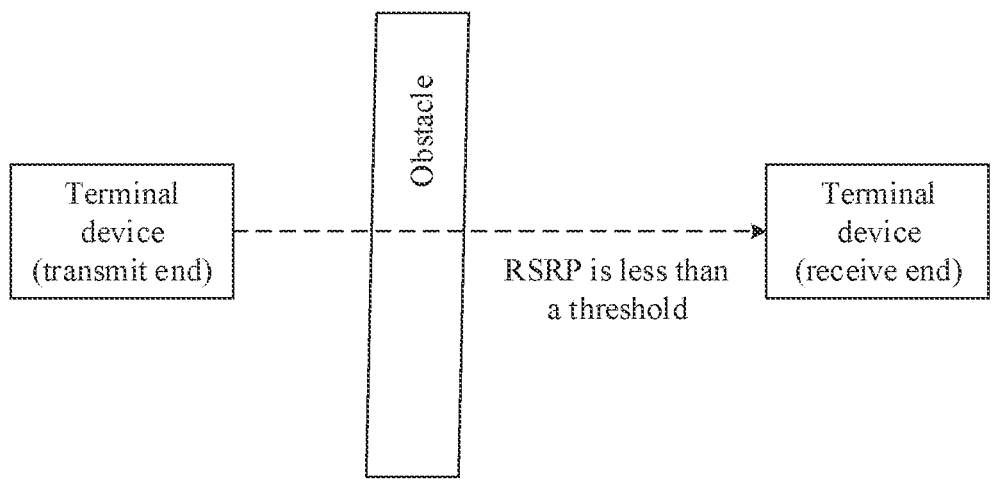
FIG. 6B is another schematic diagram of a scenario in which resource collision may occur.

Alternatively, refer to FIG. 6B. If an obstacle exists between a V2X terminal device at a transmit end and a V2X terminal device at a receive end, the V2X terminal device at the receive end measures a signal from the V2X terminal device at the transmit end to obtain an RSRP value, where the obtained RSRP value may alternatively be lower than the threshold $Th_{prioTX,prioRX}$. Therefore, a resource used by the V2X terminal device at the transmit end is not excluded by the V2X terminal device at the receive end. However, due to mobility of the terminal device or mobility of the obstacle, when the V2X terminal device at the receive end performs transmission on the resource that is not excluded, the obstacle between the V2X terminal device at the receive end and the V2X terminal device at the transmit end may no longer exist. In this case, the resource used by the V2X terminal device at the transmit end needs to be excluded. If the resource used by the V2X terminal device at the transmit end is not excluded, when selecting a resource, the terminal device at the receive end may select the resource used by the terminal device at the transmit end, and consequently a resource collision may occur. For example, if the two V2X terminal devices choose to send data in a same subframe, because the two V2X terminal devices are close to each other, severe interference is caused, and transmission performance is reduced.

In view of this, technical solutions in this embodiment of this application are provided. In this embodiment of this application, an unavailable time-frequency resource excluded by a first terminal apparatus may include a time-frequency resource determined based on location information of the first terminal apparatus and location information of another terminal apparatus. To be specific, in this embodiment of this application, the unavailable time-frequency resource may be excluded directly based on locations of the terminal apparatuses. Screening is performed based on the locations, so that a case in which some time-frequency resources that need to be excluded are not excluded can be avoided as much as possible, to reduce a resource collision probability. For example, a terminal device 1 and a terminal device 2 are close to each other. However, when the terminal device 1 performs resource exclusion, an obstacle may exist exactly between the two terminal devices. Therefore, an RSRP value that corresponds to the terminal device 2 and that is obtained by the terminal device 1 through measurement is small, and may be less than a threshold. If exclusion is performed based on RSRP, a resource occupied by the terminal device 2 is not excluded. However, after the measurement is completed, the obstacle may move. In this case, actually, the RSRP value that corresponds to the terminal device 2 and that is obtained by the terminal device 1 through measurement needs to be large, but the resource occupied by the terminal device 2 is not excluded by the terminal device 1. Therefore, the terminal device 1 may select the resource occupied by the terminal device 2 to send data, and consequently a resource collision may occur. However, if exclusion is performed based on a distance according to the method provided in this embodiment of this application, the resource occupied by the terminal device 2 is excluded. It can be learned that the method provided in this embodiment of this application improves exclusion accuracy, and reduces a possibility of a resource collision.

The technical solutions provided in this embodiment of this application may be applied to a sidelink scenario, for example, a D2D scenario or a V2X scenario, where the D2D scenario may be an NR D2D scenario, an LTE D2D scenario, or the like, and the V2X scenario may be an NR V2X scenario, an LTE V2X scenario, or the like. Alternatively, the technical solutions may be applied to another similar scenario or another communications system in a future communications system. This is not specifically limited.

Figure 7:
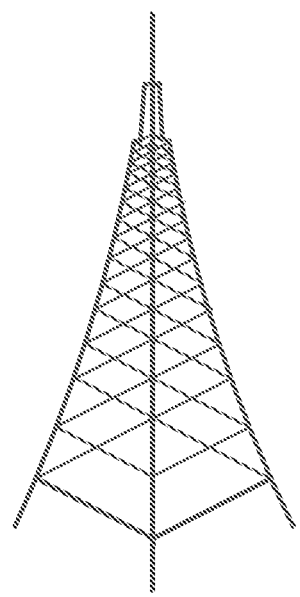
FIG. 7 is a schematic diagram of an application scenario according to an embodiment of this application.
Figure 7:
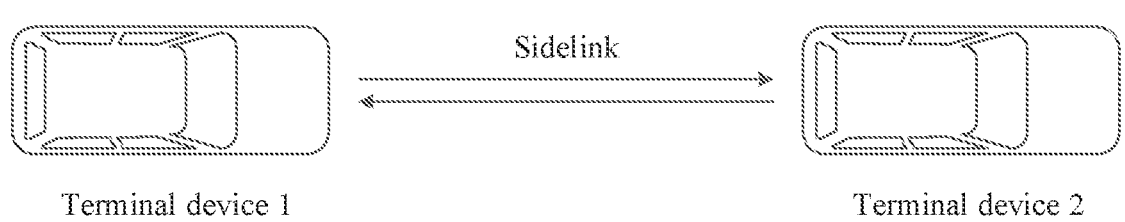

The following describes a network architecture to which this embodiment of this application is applied. FIG. 7 shows a network architecture to which an embodiment of this application is applied.

FIG. 7 includes a network device and two terminal devices: a terminal device 1 and a terminal device 2. Both the two terminal devices may be covered by the network device, only the terminal device 1 may be covered by the network device and the terminal device 2 may not be covered by the network device, or neither of the two terminal devices may be covered by the network device. The two terminal devices may perform communication with each other through a sidelink. In FIG. 7, for example, neither of the two terminal devices is covered by the network device shown in FIG. 7. The two terminal devices each may be a V2X terminal device, a D2D terminal device, or the like. This is not specifically limited. Certainly, a quantity of terminal devices in FIG. 7 is merely an example. In actual application, the network device may provide services for a plurality of terminal devices.

For example, the network device in FIG. 7 is an access network device, for example, a base station, or may be an RSU. The base station is used as an example in FIG. 7. The access network device corresponds to different devices in different systems. For example, the access network device may correspond to an eNB in a 4th generation mobile communication technology (4th generation, 4G) system, and correspond to a 5G access network device, for example, a gNB, in a 5G system.

For example, the terminal device in FIG. 7 is a vehicle-mounted terminal device or a vehicle. However, the terminal device in this embodiment of this application is not limited thereto.

The following describes, with reference to the accompanying drawings, the technical solutions provided in the embodiments of this application.

Figure 8:
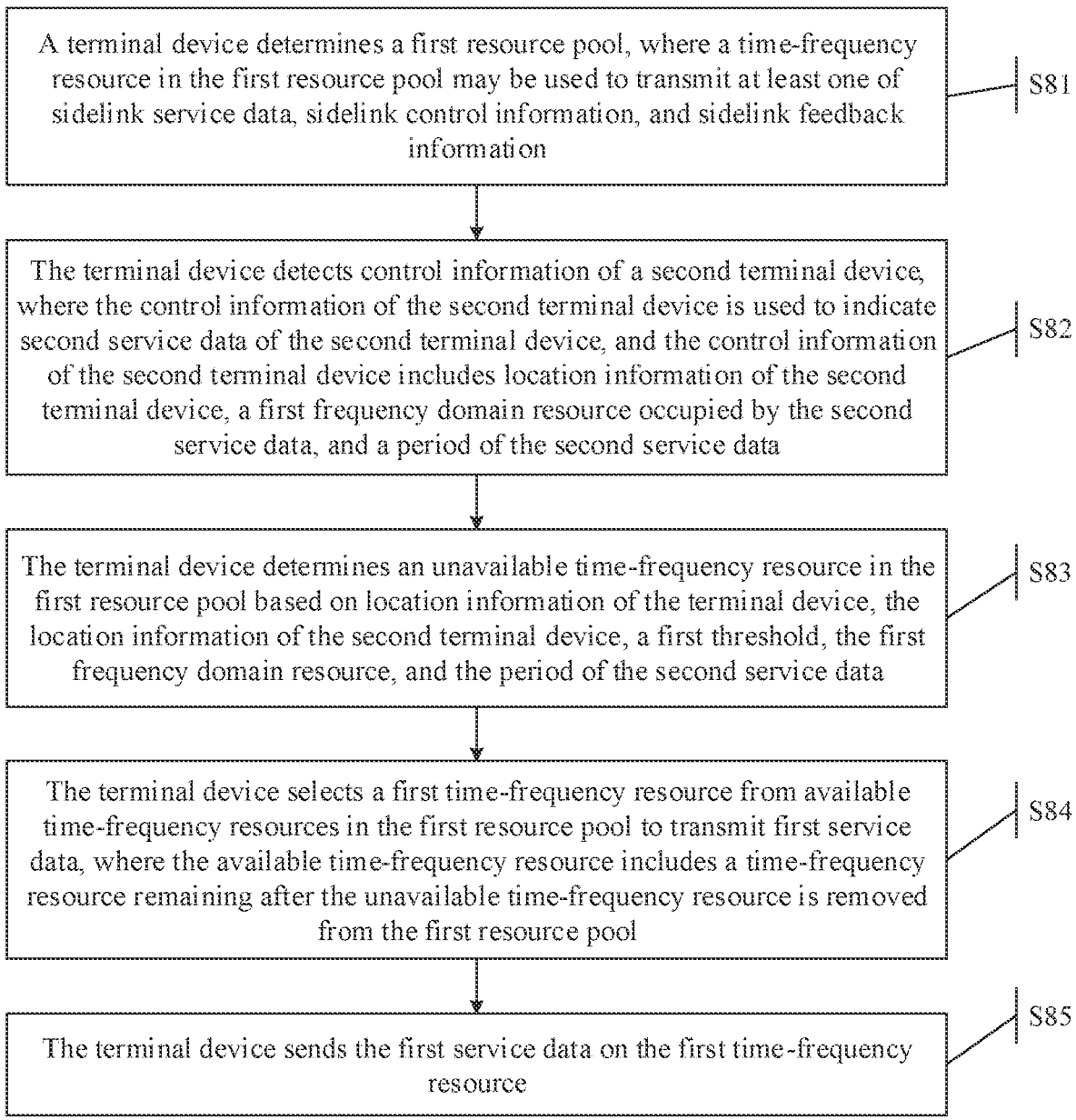
FIG. 8 is a flowchart of a communications method according to an embodiment of this application.

An embodiment of this application provides a communications method. FIG. 8 is a flowchart of the method. In the following description process, for example, the method is applied to the network architecture shown in FIG. 7. In addition, the method may be performed by two communications apparatuses. The two communications apparatuses are, for example, a first communications apparatus and a second communications apparatus. The first communications apparatus may be a network device, or may be a communications apparatus that can support the network device in implementing functions required by the method, for example, a component included in the network device. Alternatively, the first communications apparatus may be a terminal device, or may be a communications apparatus that can support the terminal device in implementing functions required by the method, for example, a component included in the terminal device. Certainly, the first communications apparatus may alternatively be another communications apparatus, for example, a chip system in a network device or a terminal device. Similarly, the second communications apparatus may be a network device, or a communications apparatus that can support the network device in implementing functions required by the method, for example, a component included in the network device. Alternatively, the second communications apparatus may be a terminal device, or a communications apparatus that can support the terminal device in implementing functions required by the method, for example, a component included in the terminal device. Certainly, the second communications apparatus may alternatively be another communications apparatus, for example, a chip system. In addition, implementations of the first communications apparatus and the second communications apparatus are not limited. For example, the two communications apparatuses may be implemented in a same form, for example, the two communications apparatuses are implemented in a form of a device. Alternatively, the two communications apparatuses may be implemented in different forms, for example, the first communications apparatus is implemented in a form of a device, and the second communications apparatus is implemented in a form of a chip system, or the like. The network device is, for example, a base station. In this embodiment of this application, the communications apparatus that can implement the function of the terminal device may also be referred to as a terminal apparatus. For example, if the first communications apparatus is configured to implement the function of the terminal device (for example, the first communications apparatus is the terminal device, or may be the communications apparatus that can support the terminal device in implementing the function required by the method, for example, the component included in the terminal device), the first communications apparatus may also be referred to as a first terminal apparatus.

For ease of description, an example in which the method is performed by the network device and the terminal device is used below. In other words, an example in which the first communications apparatus is the network device and the second communications apparatus is the terminal device is used. An example in which this embodiment is applied to the network architecture shown in FIG. 7 is used. Therefore, a network device described below may be the network device in the network architecture shown in FIG. 7, and a terminal device described below may be the terminal device 1 or the terminal device 2 in the network architecture shown in FIG. 7. If the terminal device described below is the terminal device 1 in the network architecture shown in FIG. 7, another terminal device described below may be the terminal device 2 in the network architecture shown in FIG. 7. Alternatively, if the terminal device described below is the terminal device 2 in the network architecture shown in FIG. 7, another terminal device described below may be the terminal device 1 in the network architecture shown in FIG. 7.

S81: A terminal device determines a first resource pool, where a time-frequency resource in the first resource pool is available for transmitting at least one of sidelink service data, sidelink control information, and sidelink feedback information.

In this embodiment of this application, the time-frequency resource may also be briefly referred to as a resource. In other words, the two concepts of "resource" and "time-frequency resource" in this embodiment of this application may be changed.

The first resource pool includes a time-frequency resource that is specified in a protocol and that can be used by the terminal device to transmit periodic information. The first resource pool may include a plurality of time units, the plurality of time units in the first resource pool may be consecutively numbered in a time sequence, and the time units are symbols or slots.

It should be understood that the periodic information in this embodiment of this application may include at least one of sidelink service data, sidelink control information, and sidelink feedback information. The sidelink service data is carried on a PSSCH, the sidelink control information is carried on a physical sidelink control channel (physical sidelink control channel, PSCCH), and the sidelink feedback information is carried on a physical sidelink feedback channel (physical sidelink feedback channel, PSFCH). The sidelink service data is mainly used as an example below for description, and is briefly referred to as service data.

It should be further understood that "transmitting" the service data by the terminal device may be understood as "sending" the service data by the terminal device, or may be described in another manner. This is not limited in this embodiment of this application.

Time units corresponding to the first resource pool may be $t_0^{SL}, t_1^{SL}, \ldots,$ and $t_{T_{max}}^{SL}$, where $t_i^{SL}$ represents a time unit that is available for transmit service data, and i=0, 1, . . . , and max. A time unit corresponding to a resource pool or a time unit corresponding to a time-frequency resource included in the resource pool may be understood as a time unit included in the resource pool. Specifically, if the time unit is a symbol, $0 \leq t_i^{SL} < 10240 \times N_{slot} \times 14$, where 10240 represents a total quantity of subframes in one system frame, $N_{slot}$ represents a quantity of slots in each subframe at different subcarrier spacings, and $10240 \times N_{slot} \times 14$ represents a total quantity of symbols in one system frame. Alternatively, if the time unit is a slot, $0 \leq t_i^{SL} < 10240 \times N_{slot}$. In addition, the following time units need to be excluded from the time units included in the first resource pool:

(1) a time unit used to transmit a sidelink synchronization signal SLSS;

(2) a downlink time unit and a special time unit in which the terminal device works in a TDD mode; and (3) a reserved time unit.

In this case, the time units included in the first resource pool in this embodiment of this application may include any one of the following:

(1) In all time units in a system frame corresponding to a preset subcarrier spacing, the time unit configured for sending the SLSS in the system frame is excluded, and the downlink time unit and the special time unit in the TDD mode are further excluded.

(2) In all time units in a system frame corresponding to a preset subcarrier spacing, the time unit configured for sending the SLSS in the system frame and a time unit configured for sending a cell-specific sounding reference signal (sounding reference signal, SRS) in the system frame are excluded, and the downlink time unit and the special time unit in the TDD mode are further excluded.

(3) In all time units in a system frame corresponding to a preset subcarrier spacing, the time unit configured for sending the SLSS in the system frame, a time unit configured for sending a cell-specific SRS in the system frame, and a time unit configured for sending a physical random access channel (physical random access channel, PRACH) in the system frame are excluded, and the downlink time unit and the special time unit in the TDD mode are further excluded.

(4) In all time units in a system frame corresponding to a preset subcarrier spacing, the time unit configured for sending the SLSS in the system frame, a time unit configured for sending a cell-specific SRS in the system frame, and a time unit reserved for a physical uplink shared channel (physical uplink shared channel, PUSCH) in the system frame are excluded, and the downlink time unit and the special time unit in a TDD mode are further excluded.

(5) In all time units in a system frame corresponding to a preset subcarrier spacing, the time unit configured for sending the SLSS in the system frame, a time unit configured for sending a cell-specific SRS in the system frame, a time unit configured for sending a PRACH in the system frame, and a time unit reserved for a PUSCH in the system frame are excluded, and the downlink time unit and the special time unit in the TDD mode are further excluded.

It should be understood that (1) to (5) are merely examples of possible forms of the time units included in the first resource pool, and do not constitute a limitation on the protection scope of this embodiment of this application. The first resource pool in this embodiment of this application may be a time-frequency resource set that is defined in an existing protocol and that is available for transmitting a PSSCH, for example, the fifth resource pool described above, or may be a time-frequency resource set that is defined in a future protocol in a communications technology development process and that is available for transmitting a PSSCH. This is not strictly limited in this embodiment of this application. Details about the first resource pool are not described herein again.

Specifically, the time-frequency resource in the first resource pool corresponds to a plurality of time units, and the plurality of time units may be consecutively numbered in a time sequence. In other words, each of the plurality of time units corresponding to the time-frequency resource has a corresponding number. The number of each time unit may be understood as a rank or a location of the time unit in the plurality of time units included in the first resource pool.

For example, the plurality of time units included in the first resource pool may be consecutively numbered in a time sequence starting from a number 0. After the plurality of time units are sorted in ascending order, the plurality of time units included in the first resource pool may be $t_0^{SL}$, $t_1^{SL}$, ..., and $t_{max}^{SL}$. In this case, the plurality of time units included in the first resource pool may be respectively referred to as a $0^{th}$ time unit, a $1^{st}$ time unit, ..., and a $max^{th}$ time unit, where a value of max is a value obtained by subtracting 1 from a total quantity of time units corresponding to the first resource pool.

Alternatively, the plurality of time units in the first resource pool may be consecutively numbered in a time sequence starting from a number 1. After the plurality of time units are sorted in ascending order, the plurality of time units included in the first resource pool may be $t_1^{SL}$, $t_2^{SL}$, ..., and $t_{max+1}^{SL}$. In this case, the plurality of time units included in the first resource pool may be referred to as a $1^{st}$ time unit, a $2^{nd}$ time unit, ..., and a $(max+1)^{th}$ time unit.

Alternatively, the plurality of time units in the first resource pool may be consecutively numbered in a time sequence starting from a number Y. After the plurality of time units are sorted in ascending order, the plurality of time units included in the first resource pool may be $t_Y^{SL}$, $t_{Y+1}^{SL}$, ..., and $t_{max+Y}^{SL}$. In this case, the plurality of time units included in the first resource pool may be referred to as a $Y^{th}$ time unit, a $(Y+1)^{th}$ time unit, ..., and a $(max+Y)^{th}$ time unit, where Y is a positive integer.

It should be understood that, in this embodiment of this application, a specific number from which the plurality of time units included in the first resource pool are consecutively numbered in a time sequence is not limited, provided that the plurality of time units included in the first resource pool are sorted in ascending order of numbers. For ease of understanding, a specific example is used below to describe how the plurality of time units included in the first resource pool are sorted in ascending order of numbers.

For example, the first resource pool includes 10 time units: SL #1 to SL #10. The 10 time units are sorted starting from a number 0, and are numbered sequentially by using a tolerance of an arithmetic progression as 1. In this case, the 10 time units are numbered sequentially 0, 1, 2, 3, 4, 5, 6, 7, 8, and 9. Finally, the 10 time units are sorted in ascending order of numbers, and a sorting result is: SL #1, SL #2, SL #3, SL #4, SL #5, SL #6, SL #7, SL #8, SL #9, and SL #10.

The foregoing briefly describes, by using an example, a manner in which the time units included in the first resource pool are sorted in ascending order of numbers in this embodiment of this application. It should be understood that the foregoing descriptions are merely examples, and cannot limit the protection scope of this embodiment of this application. A specific sorting manner cannot be enumerated completely. Therefore, details are not described herein.

For example, if the technical solutions in this embodiment of this application are applied to an LTE system, the first resource pool may be the fifth resource pool described above, and the time unit included in the first resource pool may be a subframe. Alternatively, if the technical solutions provided in this embodiment of this application are applied to an NR system, the time unit included in the first resource pool may be a slot, a symbol, or the like.

S82: The terminal device detects control information of a second terminal device, where the control information of the second terminal device is used to indicate second service data of the second terminal device, and the control information of the second terminal device includes location information of the second terminal device and a periodicity of the second service data.

Within first duration before first service data to be sent by the terminal device arrives, the terminal device may continuously perform sensing (sensing) on the first resource pool, or the terminal device may continuously detect control information from another device. The control information is, for example, SCI. Before the first service data arrives, after detecting the control information, the terminal device may store the detected control information, and after the first service data arrives, the terminal device performs processing such as parsing on the stored control information, to obtain information included in the control information, or may perform measurement or the like on a corresponding reference signal based on a resource location indicated by the control information. Alternatively, within the first duration before the first service data arrives, after detecting the control information, the terminal device may parse the control information to obtain information included in the control information, or may perform measurement or the like on a corresponding reference signal based on a resource location that is of the reference signal and that is indicated by the control information; and may store a result of parsing the control information, for example, may store the information obtained from the control information, and may store a measurement result of the reference signal, where the measurement result of the reference signal includes, for example, RSRP.

For example, in a process in which the terminal device performs sensing on the first resource pool, the terminal device receives the control information from the second terminal device, where the control information of the second terminal device may indicate the second service data of the second terminal device, and the control information may include information about the second service data, for example, include the location information of the second terminal device, a frequency domain resource (for example, referred to as a first frequency domain resource) occupied by the second service data, and the periodicity of the second service data. In addition, the control information may further indicate a resource location of a reference signal, so that the terminal device can measure the reference signal based on the resource location indicated by the control information, to obtain a measurement result, where the measurement result includes, for example, RSRP, and certainly may further include other information.

S83: The terminal device determines an unavailable time-frequency resource in the first resource pool based on location information of the terminal device, the location information of the second terminal device, a first threshold, the first frequency domain resource, and the periodicity of the second service data.

For example, the first service data of the terminal device arrives in a second time unit. In this case, when the first service data arrives, the terminal device needs to select, from the first resource pool, a time-frequency resource used to send the first service data. If the first service data is not periodic data, or the first service data needs to be sent only once, the terminal device only needs to select a time-frequency resource used for current sending. Alternatively, if the first service data is periodic data, the terminal device needs to reserve a periodic time-frequency resource. For example, a higher layer of the terminal device triggers a physical layer of the terminal device to select a resource, or a higher layer of the terminal device triggers a physical layer of the terminal device to transmit data. In these cases, the physical layer of the terminal device may determine that service data arrives. The following describes how the terminal device selects the time-frequency resource used to send the first service data.

For example, the terminal device continuously listens to a time-frequency resource in $[t_{n'-P}^{SL}, t_{n'-P+1}^{SL}, \ldots,$ and $t_{n'-1}^{SL}]$ other than a time-frequency resource on which the terminal device has sent data. Herein, P may be preconfigured by the network device, or may be specified in a protocol. For example, $P = P_N \times S_{symbol}$, where $P_N$ is a positive integer, and $S_{symbol}$ represents a quantity of time units that are available for transmitting sidelink service data in one frame structure period in a current frame structure configuration. If a second time unit belongs to the time units included in the first resource pool, n' is a number of the second time unit in the time units included in the first resource pool, or if a second time unit does not belong to the time units included in the first resource pool, n' is a number of a $1^{st}$ time unit that belongs to the first resource pool after the second time unit. The terminal device needs to exclude the unavailable time-frequency resource in the first resource pool, and then select a time-frequency resource from available time-frequency resources that belong to the first resource pool in $[n+T_1, n+T_2]$ to send the first service data. When the terminal device excludes the unavailable time-frequency resource in the first resource pool, the terminal device needs to exclude a time-frequency resource occupied by the terminal device for sending other service data, and also needs to exclude a time-frequency resource occupied by another terminal device. The following describes exclusion principles of the terminal device.

1. In a first exclusion principle, the terminal device excludes a time-frequency resource occupied by the terminal device for sending other service data from the first resource pool.

For example, if the terminal device further sends third service data in addition to the first service data, the unavailable time-frequency resource in the first resource pool includes a time-frequency resource reserved (or occupied) by the terminal device for the third service data. A sending time of the third service data may be within first duration before a time point at which the first service data arrives. For example, if the third service data is periodic service data, the terminal device periodically sends the third service data. In this case, that a sending time of the third service data is within first duration before a time point at which the first service data arrives herein means that a sending time of the third service data in at least one period is within the first duration.

The first duration may also be referred to as a second time unit set. Specifically, the terminal device determines that data sent in a time unit in the second time unit set is sent again in a time unit in a third time unit set. To be specific, the terminal device needs to exclude the time unit in which the data is sent again in the third time unit set, and determine, from time units that are not excluded from the third time unit set, the time unit used to send the first service data. The "sending again" herein means that the data sent in the time unit in the second time unit set is periodic and needs to be periodically sent, and therefore the data is sent again in the time unit in the third time unit set. The data sent in the time unit in the second time unit set may be the same as or different form the data sent again in the time unit in the third time unit set.

The second time unit set includes $P_N \times S_{symbol}$ time units before the second time unit, where: $P_N$ is a positive integer. In addition, the second time unit set is a subset of time units included in the first resource pool, and the third time unit set is also a subset of time units included in the first resource pool. The third time unit set is after the second time unit set in terms of time. The $P_N \times S_{symbol}$ time units are consecutively numbered from $n'-P_N \times S_{symbol}$ to $n'-1$. When the second time unit belongs to the time units included in the first resource pool, n' is a number of the second time unit in the time units included in the first resource pool. Alternatively, when the second time unit does not belong to the time units included in the first resource pool, n' is a number of a $1^{st}$ time unit that belongs to the first resource pool after the second time unit.

A specific value of $P_N$ may be configured by the network device for the terminal device by using higher layer signaling, or may be predefined in a protocol. This is not limited in this embodiment of this application. For example, if the higher layer signaling indicates that $P_N$ is 100, a second resource pool includes $100 \times S_{symbol}$ time units before a time unit corresponding to the second time unit, where $100 \times S_{symbol}$ time units are numbered in sequence from $n'-100 \times S_{symbol}$ to $n'-1$.

For example, the second time unit is one time unit in total time units in one system frame, the total time units in the system frame are numbered in a time sequence, and the second time unit is numbered n. For example, when the time unit in this embodiment of this application is a symbol, a total quantity of time units in one system frame is $10240 \times 14 \times Q$, where Q is a quantity of slots in each subframe corresponding to a preset subcarrier spacing. When the time unit in this embodiment of this application is a slot (slot), a total quantity of time units in one system frame is $10240 \times Q$, where Q is a quantity of slots in each subframe corresponding to a preset subcarrier spacing. The $10240 \times 14 \times Q$ or $10240 \times Q$ time units are numbered in a time sequence. It is assumed that the second time unit is a time unit numbered 10 in total time units in one system frame. Specifically, the time units included in the first resource pool are time units obtained by numbering, in a time sequence, time units remaining when some time units are excluded from total time units in one system frame. It is assumed that when some time units in the total time units in the system frame are excluded to obtain the time units included in the first resource pool, time units numbered 0 to 5 in time units numbered 0 to 10 in the total time units in the system frame are excluded. In this case, when the second time unit is the time unit included in the first resource pool, the second time unit in the first resource pool is numbered 4.

If a resource $R_{u,v}$ in the first resource pool meets both Condition 1 and Condition 2, the resource $R_{u,v}$ needs to be excluded.

Condition 1: The terminal device has sent the third service data on the time-frequency resource $R_{u,z}$, where u represents a frequency domain resource (or a frequency domain location) corresponding to the time-frequency resource $R_{u,z}$, and z represents a time unit (or a time domain location) corresponding to the time-frequency resource $R_{u,z}$, for example, z represents a time unit $t_z^{SL}$. The time unit $t_z^{SL}$ is within the first duration before the time point at which the first service data arrives. For example, if the first service data arrives in the second time unit, the time unit $t_z^{SL}$ is within the first duration before the second time unit.

Condition 2: If an integer j satisfies Formula 1, the resource $R_{u,v}$ needs to be excluded.

$$v + j \times [S_{symbol} \times P_{rsvp\_TX}/N_{symbol}] = \quad \text{(Formula 1)}$$
$$z + q[S_{symbol} \times P'_{rsvp\_TX}/N_{symbol}]$$

Herein, z represents a number of a time unit used by the terminal device to send the third service data in the time units included in the first resource pool (that is, a time unit corresponding to the time-frequency resource $R_{u,z}$), u represents a frequency domain location of the resource $R_{u,v}$, and v represents the time unit corresponding to the resource $R_{u,v}$. It can be learned that a frequency domain location of the time-frequency resource that needs to be excluded is the same as a frequency domain location of the time-frequency resource used to send the third service data. It may also be understood that Condition 2 is to determine a time unit on the to-be-excluded resource, or to determine a time unit corresponding to the time-frequency resource that needs to be excluded. For example, after the time unit on the to-be-excluded resource is determined, a frequency domain location that needs to be excluded from the frequency domain location corresponding to the time unit on the to-be-excluded resource is determined based on Condition 1, so that the time-frequency resource that needs to be excluded can be determined, that is, an unavailable time-frequency resource can be determined, based on the determined frequency domain location and the determined time unit on the to-be-excluded resource. Herein, j=0, 1, 2, . . . , and $C_{resel}-1$, and $C_{resel}$ represents a quantity of periods included in a time-frequency resource reserved by the terminal device for the first service data, for example, $C_{resel}=10$ if the terminal device reserves resources in 10 periods for the first service data, and reserves some resources in each period; $P_{rsvp\_TX}$ represents a periodicity of the first service data; $P'_{rsvp\_TX}$ represents a periodicity of the third service data; $N_{symbol}$ represents a quantity of time units included in one frame structure period; $S_{symbol}$ represents a quantity of time units that are available for transmitting sidelink service data in one frame structure period; and q=1, 2, . . . , and Q, where if $$\left(\frac{P'_{rsvp\_TX}}{N_{symbol}}\right)/K < 1 \text{ and } n' - m \leq [S_{symbol} \times P'_{rsvp\_TX}/N_{symbol}],$$

$$Q = K/\left[\frac{P_{rsvp\_RX}}{N_{symbol}}\right]; \text{ otherwise, } Q = 1,$$

where K is a configurable value, for example, may be configured by the network device; if the second time unit belongs to the time units included in the first resource pool, n' is a number of the second time unit in the time units included in the first resource pool, or if the second time unit does not belong to the time units included in the first resource pool, n' is a number of a $1^{st}$ time unit that belongs to the first resource pool after the second time unit, where the second time unit is a time unit in which the first service data arrives; and [ ] represents rounding up or rounding down.

For example, the terminal device has sent the third service data in the time unit $t_z^{SL}$, and the third service data may also be periodic. Therefore, in addition to sending the third service data in the time unit $t_z^{SL}$, the terminal device further reserves a subsequent resource in the time unit to send the third service data. Therefore, the first exclusion principle is to exclude the time-frequency resource on which the terminal device has sent the third service data, and exclude the time-frequency resource reserved for sending the third service data.

2. In a second exclusion principle, the terminal device excludes a time-frequency resource occupied by another terminal device in the first resource pool.

In this case, the terminal device may determine the unavailable time-frequency resource in the first resource pool based on the location information of the terminal device, the location information of the second terminal device, the first threshold, the first frequency domain resource, and the periodicity of the second service data. For example, the terminal device may determine a distance between the terminal device and the second terminal device based on the location information of the terminal device and the location information of the second terminal device. If the distance between the terminal device and the second terminal device is less than or equal to the first threshold, or the distance between the terminal device and the second terminal device is less than or equal to the first threshold, and RSRP obtained by the terminal device through measurement based on the control information is greater than a second threshold, the terminal device may determine the unavailable time-frequency resource based on the periodicity of the second service data and the first frequency domain resource. Details are described below.

For example, the terminal device receives, in the first time unit, control information from the second terminal device, where the control information is, for example, SCI. The first time unit may also be within the first duration before the time point at which the first service data arrives. Since there is the second terminal device, the terminal device may also be referred to as a first terminal device. A specific name is not limited. In addition, there may be one or more second terminal devices. The terminal device may determine the distance between the terminal device and the second terminal device based on the control information. Alternatively, the terminal device may measure a reference signal based on a resource location that is of the reference signal and that is indicated by the control information, to obtain an RSRP value, and the terminal device may determine the distance between the terminal device and the second terminal device based on the control information. Specifically, an operation performed by the terminal device based on the control information may be configured by the network device, or may be specified in a protocol.

The terminal device determines the distance between the terminal device and the second terminal device only based on the control information, but does not measure the reference signal based on the control information. In this case, if the terminal device determines that the distance between the terminal device and the second terminal device is less than or equal to the first threshold, the terminal device may determine the unavailable time-frequency resource based on the periodicity of the second service data and the first frequency domain resource. For example, a frequency domain resource corresponding to the unavailable time-frequency resource includes the first frequency domain resource.

Alternatively, the terminal device measures the reference signal based on the control information (that is, measures the reference signal based on the resource location that is of the reference signal and that is indicated by the control information), to obtain an RSRP value, and determines the distance between the terminal device and the second terminal device based on the control information. In this case, if the RSRP value obtained through measurement is greater than the second threshold, and the distance between the terminal device and the second terminal device is less than or equal to the first threshold, the terminal device may determine the unavailable time-frequency resource based on the periodicity of the second service data and the first frequency domain resource, that is, the terminal device can determine that the time-frequency resource reserved by the another terminal device is the unavailable time-frequency resource only when both the two conditions are met. Alternatively, if the RSRP value obtained through measurement is greater than the second threshold, or the distance between the terminal device and the second terminal device is less than or equal to the first threshold, the terminal device may determine the unavailable time-frequency resource based on the periodicity of the second service data and the first frequency domain resource, that is, provided that either of the two conditions is met, the terminal device may determine that the time-frequency resource reserved by the second terminal device is the unavailable time-frequency resource. For example, a frequency domain resource corresponding to the unavailable time-frequency resource includes the first frequency domain resource.

As described above, the terminal device may determine the unavailable time-frequency resource based on the periodicity of the second service data and the first frequency domain resource. Alternatively, the terminal device may determine the unavailable time-frequency resource based on the periodicity of the second service data and a second frequency domain resource. The second frequency domain resource includes, for example, the first frequency domain resource, and the second frequency domain resource may be larger than the first frequency domain resource. For example, a frequency domain resource corresponding to the unavailable time-frequency resource includes the second frequency domain resource. For example, the frequency domain resource corresponding to the unavailable time-frequency resource includes a frequency domain resource obtained by adding a first offset to the first frequency domain resource, and the second frequency domain resource is obtained by adding the first frequency domain resource to the frequency domain resource. Whether the first offset is an offset in a high frequency direction, an offset in a low frequency direction, or an offset in a high frequency direction and a low frequency direction, and a value of the first offset may be specified in a protocol, or may be configured by the network device. The terminal device determines the unavailable time-frequency resource based on the second frequency domain resource, so that more resources that may conflict with each other may be excluded as much as possible, to improve reliability.

In addition, when the terminal device determines the unavailable time-frequency resource based on the periodicity of the second service data and the first frequency domain resource, it is considered that the frequency domain resource occupied by the control information is the first frequency domain resource, or the frequency domain resource occupied by the control information is included in the first frequency domain resource. If the frequency domain resource occupied by the control information is different from the first frequency domain resource, the terminal device may determine the unavailable time-frequency resource based on the periodicity of the second service data, the first frequency domain resource, and the frequency domain resource occupied by the control information. For example, the frequency domain resource corresponding to the unavailable time-frequency resource includes the first frequency domain resource and the frequency domain resource occupied by the control information. Because the frequency domain resource occupied by the control information is also reserved by the second terminal device, the terminal device may also exclude the frequency domain resource, to reduce a possibility of a resource conflict.

In this embodiment of this application, the distance may be directly used as a principle for excluding the time-frequency resource by the terminal device. To be specific, in this embodiment of this application, the unavailable time-frequency resource may be excluded directly based on an actual distance between the terminal devices. Screening performed based on the distance is more accurate than screening performed based on the RSRP, so that a case in which some time-frequency resources that need to be excluded are not excluded can be avoided as much as possible, to reduce a resource selection collision probability.

In some scenarios, for example, although the terminal device 1 and the terminal device 2 are close to each other, the two terminal devices may not move for a long time, or a fixed obstacle exists between the two terminal devices for a long time. In this case, the terminal device 1 may not exclude a time-frequency resource reserved by the terminal device 2, to increase a resource selection range of the terminal device 1. In these scenarios, in this embodiment of this application, screening may be performed based on the RSRP in addition to the distance. For example, when both the two screening conditions are met, a corresponding time-frequency resource may be excluded as the unavailable time-frequency resource, so that a resource selection range of the terminal device can be increased, and transmission efficiency can be improved.

(1) First Implementation of the Second Exclusion Principle

In this implementation, the terminal device determines the distance between the terminal device and the second terminal device only based on the control information, and does not need to measure the control information. If the terminal device determines that the distance between the terminal device and the second terminal device is less than or equal to the first threshold, the terminal device determines that the time-frequency resource reserved by the second terminal device is the unavailable time-frequency resource.

If a time-frequency resource $R_{x,y}$ in the first resource pool meets Condition 3, Condition 4, and Condition 5, the time-frequency resource $R_{x,y}$ needs to be excluded.

Condition 3: The terminal device receives, on a time-frequency resource $R_{x,m}$, control information from the second terminal device, where the control information is, for example, SCI, and the terminal device decodes the control information. Herein, x represents a frequency domain location corresponding to the time-frequency resource $R_{x,m}$, and m represents a time unit corresponding to the time-frequency resource $R_{x,m}$, for example, m represents a time unit $t_m^{SL}$. The control information may be used to indicate the second service data sent by the second terminal device, and the control information may include information about the second service data, for example, include the periodicity of the second service data and the first frequency domain resource occupied by the second service data, and may further include information such as a priority of the second service data and a status in which the second terminal device reserves a time-frequency resource for the second service data. The frequency domain resource occupied by the control information may or may not be the first frequency domain resource. The time unit $t_m^{SL}$ is, for example, referred to as a first time unit. For example, the control information is SCI. A "resource reservation" field in the SCI indicates a value of $P_{rsvp\_RX}$, a "priority" field in the SCI indicates a value of prioRX, and a "location (location)" field in the SCI is used to indicate a value of $Loca_{RX}$. Herein, $P_{rsvp\_RX}$ represents the periodicity of the second service data sent by the second terminal device on the resource $R_{x,y}$, prioRX represents the priority of the second service data sent by the second terminal device on the resource $R_{x,y}$, and $Loca_{RX}$ is used to represent the location information of the second terminal device, for example, coordinate information of the second terminal device.

Condition 4: The terminal device determines a distance between the terminal device and the second terminal device based on location information of the terminal device and $Loca_{RX}$, where the distance is less than or equal to the first threshold, for example, the first threshold is represented as $Th'_{prioTX,prioRX}$.

The first threshold may be a predefined value, for example, predefined in a protocol. Alternatively, the first threshold may be configured by the network device for the terminal device. For example, the network device sends first signaling to the terminal device, where the first signaling indicates the first threshold. After receiving the first signaling from the network device, the terminal device may determine the first threshold based on the first signaling. The first signaling is, for example, RRC signaling, or may be other signaling. Alternatively, the first threshold may be determined by the terminal device based on a priority of the first service data and a priority of the second service data. In the following description process, an example in which the first threshold is determined based on the priority of the first service data and the priority of the second service data is used.

For example, a first field may be newly added to higher layer signaling (for example, RRC signaling). For example, the first field is referred to as SL-ThresPSSCH-DISTANCE. Certainly, the field may alternatively have another name, and the name is not limited. $Th'_{prioTX,prioRX}$ may be a value indicated by a number h in the first field. In this case, the terminal device may determine the number h based on the priority of the first service data and the priority of the second service data. For example, a calculation method for h is: h=prioTX×8+prioRX+1. Certainly, a value of h may alternatively be determined in another manner, and therefore a calculation method for h may be different accordingly. After determining h, the terminal device may determine that a threshold corresponding to the number h in a first correspondence is the first threshold. For example, the first correspondence is a correspondence between a number and a threshold. For example, in Condition 4, numbers are in a one-to-one correspondence with thresholds in the first correspondence. The second service data may be service data sent by the second terminal device on the reserved time-frequency resource (that is, a time-frequency resource that needs to be excluded by the terminal device), and information such as the priority of the second service data may be obtained by using the control information. In addition, the first correspondence may be configured by using higher layer signaling, or may be predefined, for example, may be specified in a protocol. In this way, only the number needs to be carried in the first field. The terminal device may independently calculate the number h, and then determine, based on the first correspondence between the number and the threshold, the first threshold $Th'_{prioTX,prioRX}$ corresponding to the number h. Certainly, the first correspondence may alternatively be directly carried in the first field. This is not specifically limited.

Condition 5: The terminal device determines a first time unit set based on the periodicity of the second service data, where a time unit in the first time unit set is the time unit on the to-be-excluded resource. It may be understood that when Condition 3 is met, the terminal device may determine the first time unit set based on Condition 5, and then determine, based on Condition 4, a frequency domain resource (for example, a first frequency domain resource or a second frequency domain resource) that needs to be excluded, so that the terminal device can determine that a time-frequency resource including the first time unit set and the first frequency domain resource is the unavailable time-frequency resource.

A time unit y in the first time unit set can satisfy the following formula:

$$y + j \times [S_{symbol} \times P_{rsvp\_TX}/N_{symbol}] = \qquad \text{(Formula 2)}$$
$$m + q[S_{symbol} \times P_{rsvp\_RX}/N_{symbol}]$$

Herein, [ ] represents rounding up or rounding down; m represents a number of the first time unit in the time units included in the first resource pool, where the first time unit is a time unit in which the terminal device receives the control information; j=0, 1, 2, . . . , and $C_{resel}$−1, and $C_{resel}$ represents a quantity of periods included in a time-frequency resource reserved by the terminal device for the first service data, for example, $C_{resel}$=10 if the terminal device reserves resources in 10 periods for the first service data; $P_{rsvp\_TX}$ represents a periodicity of the first service data; $N_{symbol}$ represents a quantity of time units included in one frame structure configuration period in a current frame structure configuration; $S_{symbol}$ represents a quantity of time units that are available for transmitting sidelink service data in one frame structure period in a current frame structure configuration; $P_{rsvp\_RX}$ represents a periodicity of the second service data; and q=1, 2, . . . , and Q, where if $$\left(\frac{P_{rsvp\_RX}}{N_{symbol}}\right)/K < 1 \text{ and } n' - m \leq [S_{symbol} \times P_{rsvp\_RX}/N_{symbol}],$$

$$Q = K/\left[\frac{P_{rsvp\_RX}}{N_{symbol}}\right]; \text{ otherwise, } Q = 1,$$

where K is a configurable value, for example, may be configured by the network device; and if the second time unit belongs to the time units included in the first resource pool, n' is a number of the second time unit in the time units included in the first resource pool, or if the second time unit does not belong to the first resource pool, n' is a number of a $1^{st}$ time unit that belongs to the first resource pool after the second time unit, where the second time unit is a time unit in which the first service data arrives.

The second terminal device needs to send the second service data. If the second service data is periodic, the second terminal device reserves a time-frequency resource to send the second service data. Therefore, the second exclusion principle is to exclude the time-frequency resource reserved by the second terminal device for sending the second service data. Certainly, an exclusion condition is that the distance between the terminal device and the second terminal device is less than or equal to the first threshold. If the terminal device does not exclude the time-frequency resource used by the second terminal device, the two terminal devices may select a same time-frequency resource to send the service data. However, when the two terminal devices are close to each other, if the two terminal devices send the service data on the same time-frequency resource, severe interference exists between the two terminal devices, and transmission between the two terminal devices is affected. Consequently, transmission quality is poor. Therefore, in this embodiment of this application, if the two terminal devices are close to each other, one terminal device may exclude the time-frequency resource selected by the other terminal device, to reduce transmission interference and improve transmission quality of the terminal device.

In the first implementation of the second exclusion principle, the distance is used as a screening condition, so that screening accuracy is improved, and the terminal device does not need to measure RSRP, so that workload of the terminal device is reduced.

(2) Second Implementation of the Second Exclusion Principle

In this implementation, the terminal device may determine the distance between the terminal device and the second terminal device based on the control information, and also measure a reference signal based on a resource location that is of the reference signal and that is indicated by the control information, to obtain RSRP. In this case, if the terminal device determines that the distance between the terminal device and the second terminal device is less than or equal to the first threshold, or the terminal device determines that the RSRP obtained through measurement is greater than the second threshold, the terminal device determines that the time-frequency resource reserved by the second terminal device is the unavailable time-frequency resource. Alternatively, if the terminal device determines that the distance between the terminal device and the second terminal device is less than or equal to the first threshold, and the terminal device determines that the RSRP obtained through measurement is greater than the second threshold, the terminal device determines that the time-frequency resource reserved by the second terminal device is the unavailable time-frequency resource.

If a resource $R_{x,y}$ in the first resource pool meets Condition 6, Condition 7, and Condition 8, the resource $R_{x,y}$ needs to be excluded.

Condition 6: The terminal device receives, on a time-frequency resource $R_{x,m}$, control information from the second terminal device, where the control information is, for example, SCI, and the terminal device decodes the control information. Herein, x represents a frequency domain location corresponding to the time-frequency resource $R_{x,m}$, and m represents a time unit corresponding to the time-frequency resource $R_{x,m}$, for example, m represents a time unit $t_m^{SL}$. The control information may be used to indicate the second service data sent by the second terminal device, and the control information may include information about the second service data, for example, include the periodicity of the second service data and the first frequency domain resource occupied by the second service data, and may further include information such as a priority of the second service data and a status in which the second terminal device reserves a time-frequency resource for the second service data. The frequency domain resource occupied by the control information may or may not be the first frequency domain resource. The time unit $t_m^{SL}$ is, for example, referred to as a first time unit. For example, the control information is SCI. A "resource reservation" field in the SCI indicates a value of $P_{rsvp\_RX}$, a "priority" field in the SCI indicates a value of prioRX, and a "location" field in the SCI is used to indicate a value of $Loca_{RX}$. Herein, $P_{rsvp\_RX}$ represents the periodicity of the second service data sent by the second terminal device on the resource $R_{x,y}$, prioRX represents the priority of the second service data sent by the second terminal device on the resource $R_{x,y}$, and $Loca_{RX}$ is used to represent the location information of the second terminal device, for example, coordinate information of the second terminal device.

Condition 7: The terminal device determines a distance between the terminal device and the second terminal device based on the location information of the terminal device and $Loca_{RX}$, and the terminal device measures a reference signal based on a resource location that is of the reference signal and that is indicated by the control information, to obtain RSRP. The distance is less than or equal to the first threshold $Th'_{prioTX,prioRX}$, or the RSRP obtained through measurement is greater than the second threshold $Th_{prioTX,prioRX}$. Alternatively, the distance is less than or equal to the first threshold $Th'_{prioTX,prioRX}$, and the RSRP obtained through measurement is greater than the second threshold $Th_{prioTX,prioRX}$.

The first threshold may be a predefined value, for example, predefined in a protocol. Alternatively, the first threshold may be configured by the network device for the terminal device. For example, the network device sends a first message to the terminal device, where the first signaling indicates the first threshold. After receiving the first message from the network device, the terminal device may determine the first threshold based on the first signaling. The first message is, for example, RRC signaling, or may be other signaling. Alternatively, the first threshold may be determined by the terminal device based on a priority of the first service data and a priority of the second service data.

The second threshold may be a predefined value, for example, predefined in a protocol. Alternatively, the second threshold may be configured by the network device for the terminal device. For example, the network device sends second signaling to the terminal device, where the second signaling indicates the second threshold. After receiving the second signaling from the network device, the terminal device may determine the second threshold based on the second signaling. The second signaling is, for example, RRC signaling, or may be other signaling. Alternatively, the second threshold may be determined by the terminal device based on a priority of the first service data and a priority of the second service data. The first signaling may be the same as or different from the second signaling.

In the following description process, an example in which the first threshold is determined based on the priority of the first service data and the priority of the second service data, and the second threshold is determined based on the priority of the first service data and the priority of the second service data is used.

For example, a first field may be newly added to higher layer signaling (for example, RRC signaling). For example, the first field is referred to as SL-ThresPSSCH-DISTANCE. Certainly, the field may alternatively have another name, and the name is not limited. $Th'_{prioTX,prioRX}$ may be a value indicated by a number h in the first field. In this case, the terminal device may determine the number h based on the priority of the first service data and the priority of the second service data. For example, a calculation method for h is: h=prioTX×8+prioRX+1. Certainly, a value of h may alternatively be determined in another manner, and therefore a calculation method for h may be different accordingly. After determining h, the terminal device may determine that a threshold corresponding to the number h in a first correspondence is the first threshold. For example, the first correspondence is a correspondence between a number and a threshold. For example, in Condition 4, numbers are in a one-to-one correspondence with thresholds in the first correspondence. The second service data may be service data sent by the second terminal device on the reserved time-frequency resource (that is, a time-frequency resource that needs to be excluded by the terminal device), and information such as the priority of the second service data may be obtained by using the control information. In addition, the first correspondence between the number and the threshold may be configured by using higher layer signaling, or may be predefined, for example, may be specified in a protocol. In this way, only the number needs to be carried in the first field. The terminal device may independently calculate the number h, and then determine, based on the correspondence between the number and the threshold, the first threshold $Th'_{prioTX,prioRX}$ corresponding to the number h. Certainly, the first correspondence may alternatively be directly carried in the first field. This is not specifically limited.

The second threshold $Th_{prioTX,prioRX}$ represents a value indicated by a number i in a second field in higher layer signaling (for example, RRC signaling), and the second field is, for example, an SL-ThresPSSCH-RSRP field. A specific calculation method for the number i is, for example, i=prioTX×8+prioRX+1. After determining i, the terminal device may determine that a threshold corresponding to the number i in a second correspondence is the second threshold. For example, the second correspondence is a correspondence between a number and a threshold. For example, in Condition 7, numbers are in a one-to-one correspondence with thresholds in the second correspondence. For example, a second correspondence is (−128+(i−1)×2), and is in a unit of dBm. The second correspondence may be configured by using higher layer signaling, or may be predefined, for example, may be specified in a protocol. In this way, only the number needs to be carried in the second field. The terminal device may independently calculate the number i, and then determine, based on the second correspondence between the number and the threshold, the second threshold $Th_{prioTX,prioRX}$ corresponding to the number i. Certainly, the second correspondence may alternatively be directly carried in the second field. This is not specifically limited.

If Condition 7 is that the distance is less than or equal to the first threshold $Th'_{prioTX,prioRX}$, or the RSRP obtained through measurement is greater than the second threshold $Th_{prioTX,prioRX}$, a time-frequency resource that meets either of the two conditions is excluded, and therefore the terminal device may exclude a large quantity of time-frequency resources. In this case, if the terminal device does not have sufficient time-frequency resources for selection due to excessive resources excluded by the terminal device, Condition 7 may be changed to that the distance is less than or equal to the first threshold $Th'_{prioTX,prioRX}$, and the RSRP obtained through measurement is greater than the second threshold $Th_{prioTX,prioRX}$, that is, a time-frequency resource that needs to meet both the two conditions is excluded, and therefore a quantity of time-frequency resources that can be excluded by the terminal device is reduced, and sufficient selectable time-frequency resources are provided for the terminal device as much as possible.

Alternatively, regardless of whether Condition 7 is that the distance is less than or equal to the first threshold $Th'_{prioTX,prioRX}$, or the RSRP obtained through measurement is greater than the second threshold $Th_{prioTX,prioRX}$; or the distance is less than or equal to the first threshold $Th'_{prioTX,prioRX}$, and the RSRP obtained through measurement is greater than the second threshold $Th_{prioTX,prioRX}$, if the terminal device excludes excessive time-frequency resources, a quantity of time-frequency resources excluded by the terminal device may alternatively be reduced in a manner of changing the threshold. For example, a value of the first threshold $Th'_{prioTX,prioRX}$ may be decreased, or a value of the second threshold $Th_{prioTX,prioRX}$ may be increased; or a value of the first threshold $Th'_{prioTX,prioRX}$ may be decreased, and a value of the second threshold $Th_{prioTX,prioRX}$ may be increased. This is not specifically limited.

Certainly, if the threshold needs to be changed, a plurality of thresholds may be configured in advance. For example, for the first threshold, the number h may indicate a plurality of values, and the terminal device may select, for example, a smallest value in the values for the first time. If the terminal device determines that a remaining time-frequency resource is insufficient to meet a selection requirement, the terminal device may select, as a new first threshold, a value that is in the values indicated by the number h and that is greater than the value selected last time. For the second threshold, descriptions are also similar to the foregoing descriptions. This is not specifically limited.

Condition 8: The terminal device determines a first time unit set based on the periodicity of the second service data, where a tune unit in the first time unit set is the time unit on the to-be-excluded resource. It may be understood that when Condition 3 is met, the terminal device may determine the first time unit set based on Condition 5, and then determine, based on Condition 4, a frequency domain resource (for example, a first frequency domain resource or a second frequency domain resource) that needs to be excluded, so that the terminal device can determine that a time-frequency resource including the first time unit set and the first frequency domain resource is the unavailable time-frequency resource.

A time unit y in the first time unit set may satisfy Formula 2. For Formula 2, refer to the foregoing descriptions.

The second terminal device needs to send the second service data. If the second service data is periodic, the second terminal device reserves a time-frequency resource to send the second service data. Therefore, the second exclusion principle is to exclude the time-frequency resource reserved by the second terminal device for sending the second service data. Certainly, an exclusion condition is that the distance between the terminal device and the second terminal device is less than or equal to the first threshold. If the terminal device does not exclude the time-frequency resource used by the second terminal device, the two terminal devices may select a same time-frequency resource to send the service data. However, when the two terminal devices are close to each other, if the two terminal devices send the service data on the same time-frequency resource, severe interference exists between the two terminal devices, and transmission between the two terminal devices is affected. Consequently, transmission quality is poor. Therefore, in this embodiment of this application, if the two terminal devices are close to each other, one terminal device may exclude the time-frequency resource selected by the other terminal device, to reduce transmission interference and improve transmission quality of the terminal device.

In some scenarios, for example, although the terminal device 1 and the terminal device 2 are close to each other, the two terminal devices may not move for a long time, or a fixed obstacle exists between the two terminal devices for a long time. In this case, the terminal device 1 may not exclude a resource reserved by the terminal device 2, to increase a resource selection range of the terminal device 1. In these scenarios, in the second implementation of the second exclusion principle, screening may be performed based on the RSRP in addition to the distance. For example, when both the two screening conditions are met, a corresponding time-frequency resource may be excluded as the unavailable time-frequency resource, so that a resource selection range of the terminal device can be increased, and transmission efficiency can be improved.

In the first implementation and the second implementation of the second exclusion principle, only the distance between the terminal devices is considered. However, when the terminal device selects a time-frequency resource, if the terminal device selects the time-frequency resource for data retransmission, a selection priority needs to be high. To be specific, the terminal device needs to exclude as few time-frequency resources as possible, and reserve sufficient time-frequency resources for selection, to improve retransmission efficiency. Considering this factor, a third implementation of the second exclusion principle is further provided below.

(3) Third Implementation of the Second Exclusion Principle

In this implementation, the terminal device may determine the distance between the terminal device and the second terminal device based on the control information, and also measure a reference signal based on a resource location that is of the reference signal and that is indicated by the control information, to obtain RSRP. In this case, if the terminal device determines that the distance between the terminal device and the second terminal device is less than or equal to the first threshold, or the terminal device determines that the RSRP obtained through measurement is greater than the second threshold, the terminal device determines that the time-frequency resource reserved by the second terminal device is the unavailable time-frequency resource. Alternatively, if the terminal device determines that the distance between the terminal device and the second terminal device is less than or equal to the first threshold, and the terminal device determines that the RSRP obtained through measurement is greater than the second threshold, the terminal device determines that the time-frequency resource reserved by the second terminal device is the unavailable time-frequency resource.

If a resource $R_{x,y}$ in the first resource pool meets Condition 9, Condition 10, and Condition 11, the resource $R_{x,y}$ needs to be excluded.

Condition 9: The terminal device receives, on a time-frequency resource $R_{x,m}$, control information from the second terminal device, where the control information is, for example, SCI, and the terminal device decodes the control information. Herein, x represents a frequency domain location corresponding to the time-frequency resource $R_{x,m}$, and m represents a time unit corresponding to the time-frequency resource $R_{x,m}$, for example, m represents a time unit $t_m^{SL}$. The control information may be used to indicate the second service data sent by the second terminal device, and the control information may include information about the second service data, for example, include the periodicity of the second service data and the first frequency domain resource occupied by the second service data, and may further include information such as a priority of the second service data and a status in which the second terminal device reserves a time-frequency resource for the second service data. The frequency domain resource occupied by the control information may or may not be the first frequency domain resource. The time unit $t_m^{SL}$ is, for example, referred to as a first time unit. For example, the control information is SCI. A "resource reservation" field in the SCI indicates a value of $P_{rsvp\_RX}$, a "priority" field in the SCI indicates a value of prioRX, a "location" field in the SCI is used to indicate a value of $Loca_{RX}$, and a "retransmission index (retransmission index)" field in the SCI is used to indicate a value of $Re_{RX}$. Herein, $P_{rsvp\_RX}$ represents the periodicity of the second service data sent by the second terminal device on the resource $R_{x,y}$, prioRX represents the priority of the second service data sent by the second terminal device on the resource $R_{x,y}$, $Loca_{RX}$ is used to represent the location information of the second terminal device, for example, coordinate information of the second terminal device, and $Re_{RX}$ is used to indicate whether the second service data is retransmitted data.

Condition 10: The terminal device determines a distance between the terminal device and the second terminal device based on the location information of the terminal device and $Loca_{RX}$, and the terminal device measures a reference signal based on a resource location that is of the reference signal and that is indicated by the control information, to obtain RSRP. The distance is less than or equal to a first threshold $Th'_{prioTX,prioRX,Re_{TX},Re_{RX}}$, or the RSRP obtained through measurement is greater than a second threshold $Th_{prioTX,prioRX,Re_{TX},Re_{RX}}$. Alternatively, the distance is less than or equal to a first threshold $Th'_{prioTX,prioRX,Re_{TX},Re_{RX}}$, and the RSRP obtained through measurement is greater than a second threshold $Th_{prioTX,prioRX,Re_{TX},Re_{RX}}$. It can be learned that the first threshold in Condition 4 is the same as the first threshold in Condition 7, but the first threshold in Condition 10 is different from the first threshold in Condition 4 and the first threshold in Condition 7, and the second threshold in Condition 10 is also different from the second threshold in Condition 7.

The first threshold may be a predefined value, for example, predefined in a protocol. Alternatively, the first threshold may be configured by the network device for the terminal device. For example, the network device sends a first message to the terminal device, where the first signaling indicates the first threshold. After receiving the first message from the network device, the terminal device may determine the first threshold based on the first signaling. The first message is, for example, RRC signaling, or may be other signaling. Alternatively, the first threshold may be determined by the terminal device based on a priority of the first service data and a priority of the second service data.

The second threshold may be a predefined value, for example, predefined in a protocol. Alternatively, the second threshold may be configured by the network device for the terminal device. For example, the network device sends second signaling to the terminal device, where the second signaling indicates the second threshold. After receiving the second signaling from the network device, the terminal device may determine the second threshold based on the second signaling. The second signaling is, for example, RRC signaling, or may be other signaling. Alternatively, the second threshold may be determined by the terminal device based on a priority of the first service data and a priority of the second service data. The first signaling may be the same as or different from the second signaling.

In the following description process, an example in which the first threshold is determined based on the priority of the first service data and the priority of the second service data, and the second threshold is determined based on the priority of the first service data and the priority of the second service data is used.

For example, a field may be newly added to higher layer signaling (for example, RRC signaling). For example, the field is referred to as a first field. In Condition 10, the first field is, for example, an SL-ThresPSSCH-DISTANCE field, or may be another newly added field. Herein, $Th'_{prioTX,prioRX,Re_{TX},Re_{RX}}$ may be a value indicated by a number h in the first field. In this case, the terminal device may determine the number h based on the priority of the first service data and the priority of the second service data. For example, a calculation method for h is: h=prioTX×8+prioRX+1. Certainly, a value of h may alternatively be determined in another manner, and therefore a calculation method for h may be different accordingly. After determining h, the terminal device may determine that a threshold corresponding to the number h in a first correspondence is the first threshold. For example, the first correspondence is a correspondence between a number and a threshold. For example, in Condition 10, in the first correspondence, one number may correspond to one or more thresholds. The second service data may be service data sent by the second terminal device on the reserved time-frequency resource (that is, a time-frequency resource that needs to be excluded by the terminal device), and information such as the priority of the second service data may be obtained by using the control information. In addition, the first correspondence between the number and the threshold may be configured by using higher layer signaling, or may be predefined, for example, may be specified in a protocol. In this way, only the number needs to be carried in the first field. The terminal device may independently calculate the number h, and then determine, based on the first correspondence between the number and the threshold, the first threshold $Th'_{prioTX,prioRX,Re_{TX},Re_{RX}}$ corresponding to the number h. Certainly, the first correspondence may alternatively be directly carried in the first field. This is not specifically limited.

In the first correspondence between the number and the threshold, the number h may indicate at least two thresholds, and therefore the terminal device may determine, from the at least two thresholds based on retransmission information, one threshold as the first threshold $Th'_{prioTX,prioRX,Re_{TX},Re_{RX}}$. The retransmission information may include whether the first service data is retransmitted data, or whether the first service data is retransmitted data and whether the second service data is retransmitted data. Whether the first service data is retransmitted data may be determined by the terminal device, and whether the second service data is retransmitted data may be determined by the terminal device based on the value of $Re_{RX}$ obtained from the control information.

In an implementation of the retransmission information, the retransmission information may include whether the first service data is the retransmitted data. In this case, in the first correspondence, the number h may indicate two thresholds, for example, the two thresholds are a third threshold and a fourth threshold. For example, after the terminal device determines the number h, a specific threshold used as the first threshold may be independently selected by the terminal device. For example, if the retransmission information includes that the first service data is the retransmitted data, the terminal device may determine that the third threshold is the first threshold; or if the retransmission information includes that the first service data is newly transmitted data, the terminal device may determine that the fourth threshold is the first threshold. For example, if the first service data is the retransmitted data, the terminal device considers that a transmission priority of the first service data is higher, and the terminal device may select a smaller threshold from the two values indicated by the number h as the first threshold $Th'_{prioTX,prioRX,Re_{TX},Re_{RX}}$. Therefore the third threshold may be less than the fourth threshold. A smaller first threshold indicates a smaller quantity of to-be-excluded time-frequency resources, and therefore sufficient time-frequency resources can be reserved for selection by the terminal device to send the first service data. If the first service data is the newly transmitted data, the terminal device may select a larger threshold as the first threshold, to reserve more time-frequency resources for the second terminal device.

Alternatively, the first correspondence may include indication information. In this case, the terminal device does not need to independently select the first threshold from the two thresholds indicated by the number h, but may directly determine the first threshold based on the indication information. For example, the number h indicates the two thresholds in the first correspondence. In this case, one of the two thresholds may correspond to the indication information, or the two thresholds each may correspond to the indication information. For example, the third threshold in the two thresholds corresponds to first indication information, and the first indication information is used to indicate that the third threshold is the first threshold when the first service data is the retransmitted data. In this case, when the retransmission information includes that the first service data is the retransmitted data, the terminal device may determine that the third threshold is the first threshold. For the fourth threshold, the terminal device may naturally determine that the fourth threshold is the first threshold when the retransmission information includes that the first service data is the newly transmitted data. It can be learned that the two thresholds indicated by the number h may include only one piece of indication information, or may include two pieces of indication information, but implementation effects may be similar.

In another implementation of the retransmission information, the retransmission information may include whether the first service data is the retransmitted data and whether the second service data is the retransmitted data. In this case, there are four possible combination manners of the retransmission information. In this case, in the first correspondence, the number h may indicate four thresholds, for example, the four thresholds are a third threshold, a fourth threshold, a fifth threshold, and a sixth threshold. Certainly, the third threshold herein may be the same as or different from the foregoing third threshold. Similarly, the fourth threshold herein may be the same as or different from the foregoing fourth threshold.

For example, if the retransmission information includes that the first service data is the retransmitted data and the second service data is newly transmitted data, the terminal device may determine that the third threshold is the third threshold. Alternatively, if the retransmission information includes that the first service data is the retransmitted data and the second service data is the retransmitted data, the terminal device may determine that the fourth threshold is the first threshold. Alternatively, if the retransmission information includes that the first service data is newly transmitted data and the second service data is newly transmitted data, the terminal device may determine that the fifth threshold is the first threshold. Alternatively, if the retransmission information includes that the first service data is newly transmitted data and the second service data is the retransmitted data, the terminal device may determine that the sixth threshold is the first threshold.

There may be a plurality of value relationships between the third threshold, the fourth threshold, the fifth threshold, and the sixth threshold. For example, the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold. This is not specifically limited. In conclusion, a consideration principle is that if the first service data is the retransmitted data, regardless of whether the second service data is the retransmitted data, the terminal device considers that a transmission priority of the first service data is higher, and the terminal device may select a smaller threshold from the four thresholds indicated by the number h as the first threshold $Th'_{prioTX,prioRX,Re_{TX},Re_{RX}}$. A smaller first threshold indicates a smaller quantity of to-be-excluded time-frequency resources, and therefore sufficient time-frequency resources can be reserved for selection by the terminal device to send the first service data. However, if the first service data is the retransmitted data and the second service data is also the retransmitted data, the terminal device may not unlimitedly select a very small threshold as the first threshold when selecting the first threshold, because a transmission requirement of the second service data also needs to be considered. Therefore, if the retransmission information includes that the first service data is the retransmitted data and the second service data is the newly transmitted data, the terminal device may determine that the third threshold is the first threshold; or if the retransmission information includes that the first service data is the retransmitted data and the second service data is the retransmitted data, the terminal device may determine that the fourth threshold is the first threshold. For example, the third threshold may be less than or equal to the fourth threshold.

Another consideration principle is that if the first service data is the newly transmitted data, the terminal device may select a larger threshold as the first threshold, to reserve more time-frequency resources for the second terminal device, or give the terminal device and the second terminal device a same selection opportunity. Certainly, on the premise that the first service data is the newly transmitted data, if the second service data is the retransmitted data, it may be considered to reserve more selection opportunities for the second terminal device, that is, it may be considered to exclude more time-frequency resources. Therefore, if the retransmission information includes that the first service data is the newly transmitted data and the second service data is the newly transmitted data, the terminal device may determine that the fifth threshold is the first threshold; or if the retransmission information includes that the first service data is the newly transmitted data and the second service data is the retransmitted data, the terminal device may determine that the sixth threshold is the first threshold. For example, the fifth threshold may be less than or equal to the sixth threshold.

For example, after the terminal device determines the number h, a specific threshold used as the first threshold may be independently selected by the terminal device.

Alternatively, in a second implementation of the retransmission information, the first correspondence may include indication information. In this case, the terminal device does not need to independently select the first threshold from the four thresholds indicated by the number h, but may directly determine the first threshold based on the indication information. For example, the number h indicates the four thresholds in the first correspondence. In this case, each of the four thresholds may correspond to the indication information. For example, the third threshold in the four thresholds corresponds to first indication information, and the first indication information is used to indicate that the third threshold is the first threshold when the first service data is the retransmitted data and the second service data is the newly transmitted data; the fourth threshold in the four thresholds corresponds to second indication information, and the second indication information is used to indicate that the fourth threshold is the first threshold when the first service data is the retransmitted data and the second service data is the retransmitted data; the fifth threshold in the four thresholds corresponds to third indication information, and the third indication information is used to indicate that the fifth threshold is the first threshold when the first service data is the newly transmitted data and the second service data is the newly transmitted data; and the sixth threshold in the four thresholds corresponds to fourth indication information, and the fourth indication information is used to indicate that the sixth threshold is the first threshold when the first service data is the newly transmitted data and the second service data is the retransmitted data. For example, when the retransmission information includes that the first service data is the retransmitted data and the second service data is the newly transmitted data, the terminal device may determine that the third threshold is the first threshold, so that the first correspondence is indicated more clearly.

The second threshold $Th_{prioTX,prioRX,Re_{TX},Re_{RX}}$ may be a value indicated by a number i in a second field. The second field is, for example, the foregoing SL-ThresPSSCH-RSRP field, or may be another newly added field. For example, a value of i may be determined based on the priority of the first service data and the priority of the second service data. For example, a calculation method for i is: i=prioTX×8+prioRX+1. Certainly, a value of i may alternatively be determined in another manner, and therefore a calculation method for i may be different accordingly. After determining i, the terminal device may determine that a threshold corresponding to the number i in a second correspondence is the second threshold. For example, the second correspondence is a correspondence between a number and a threshold. The second service data may be service data sent by the second terminal device on the reserved time-frequency resource (that is, a time-frequency resource that needs to be excluded by the terminal device), and information such as the priority of the second service data may be obtained by using the control information. In addition, the second correspondence may be configured by using higher layer signaling, or may be predefined, for example, may be specified in a protocol. In this way, only the number needs to be carried in the second field. The terminal device may independently calculate the number i, and then determine, based on the correspondence between the number and the threshold, the second threshold $Th_{prioTX,prioRX,Re_{TX},Re_{RX}}$ corresponding to the number i. Certainly, the second correspondence may alternatively be directly carried in the second field. This is not specifically limited.

In the second correspondence between the number and the threshold, the number i may indicate at least two thresholds, and therefore the terminal device may determine, from the at least two thresholds based on retransmission information, one threshold as the second threshold $Th_{prioTX,prioRX,Re_{TX},Re_{RX}}$. The retransmission information may include whether the first service data is retransmitted data, or whether the first service data is retransmitted data and whether the second service data is retransmitted data. Whether the first service data is retransmitted data may be determined by the terminal device, and whether the second service data is retransmitted data may be determined by the terminal device based on the value of $Re_{RX}$ obtained from the control information.

In an implementation of the retransmission information, the retransmission information may include whether the first service data is the retransmitted data. In this case, in the second correspondence, the number i may indicate two thresholds, for example, the two thresholds are a seventh threshold and an eighth threshold. For example, after the terminal device determines the number i, a specific threshold used as the second threshold may be independently selected by the terminal device. For example, if the retransmission information includes that the first service data is the retransmitted data, the terminal device may determine that the seventh threshold is the second threshold; or if the retransmission information includes that the first service data is newly transmitted data, the terminal device may determine that the eighth threshold is the second threshold. For example, if the first service data is the retransmitted data, the terminal device considers that a transmission priority of the first service data is higher, and the terminal device may select a larger threshold from the two values indicated by the number i as the second threshold $Th_{prioTX,prioRX,Re_{TX},Re_{RX}}$. Therefore, the seventh threshold may be greater than the eighth threshold. A larger second threshold indicates a smaller quantity of to-be-excluded time-frequency resources, and therefore sufficient time-frequency resources can be reserved for selection by the terminal device to send the first service data. If the first service data is the newly transmitted data, the terminal device may select a smaller threshold as the second threshold, to reserve more time-frequency resources for the second terminal device.

Alternatively, the second correspondence may include indication information. In this case, the terminal device does not need to independently select the second threshold from the two thresholds indicated by the number i, but may directly determine the second threshold based on the indication information. For example, the number i indicates the two thresholds in the second correspondence. In this case, one of the two thresholds may correspond to the indication information, or the two thresholds each may correspond to the indication information. For example, the seventh threshold in the two thresholds corresponds to first indication information, and the first indication information is used to indicate that the seventh threshold is the second threshold when the first service data is the retransmitted data. In this case, when the retransmission information includes that the first service data is the retransmitted data, the terminal device may determine that the seventh threshold is the second threshold. For the eighth threshold, the terminal device may naturally determine that the eighth threshold is the second threshold when the retransmission information includes that the first service data is the newly transmitted data. It can be learned that the two thresholds indicated by the number i may include only one piece of indication information, or may include two pieces of indication information, but implementation effects may be similar.

In another implementation of the retransmission information, the retransmission information may include whether the first service data is the retransmitted data and whether the second service data is the retransmitted data. In this case, there are four possible combination manners of the retransmission information. In this case, in the second correspondence, the number i may indicate four thresholds, for example, the four thresholds are a seventh threshold, an eighth threshold, a ninth threshold, and a tenth threshold. Certainly, the seventh threshold herein may be the same as or different from the foregoing seventh threshold. Similarly, the eighth threshold herein may be the same as or different from the foregoing eighth threshold.

For example, if the retransmission information includes that the first service data is the retransmitted data and the second service data is newly transmitted data, the terminal device may determine that the seventh threshold is the second threshold. Alternatively, if the retransmission information includes that the first service data is the retransmitted data and the second service data is the retransmitted data, the terminal device may determine that the eighth threshold is the second threshold. Alternatively, if the retransmission information includes that the first service data is newly transmitted data and the second service data is newly transmitted data, the terminal device may determine that the ninth threshold is the second threshold. Alternatively, if the retransmission information includes that the first service data is newly transmitted data and the second service data is the retransmitted data, the terminal device may determine that the tenth threshold is the second threshold.

There may be a plurality of value relationships between the seventh threshold, the eighth threshold, the ninth threshold, and the tenth threshold. For example, the seventh threshold>the eighth threshold>the ninth threshold>the tenth threshold, the seventh threshold=the eighth threshold>the ninth threshold>the tenth threshold, or the seventh threshold>the eighth threshold>the ninth threshold=the tenth threshold. This is not specifically limited. In conclusion, a consideration principle is that if the first service data is the retransmitted data, regardless of whether the second service data is the retransmitted data, the terminal device considers that a transmission priority of the first service data is higher, and the terminal device may select a smaller threshold from the four thresholds indicated by the number i as the second threshold $Th_{prioTX,prioRX,Re_{TX},Re_{RX}}$. A larger second threshold indicates a smaller quantity of to-be-excluded time-frequency resources, and therefore sufficient time-frequency resources can be reserved for selection by the terminal device to send the first service data. However, if the first service data is the retransmitted data and the second service data is also the retransmitted data, the terminal device may not unlimitedly select a very large threshold as the second threshold when selecting the second threshold, because a transmission requirement of the second service data also needs to be considered. Therefore, if the retransmission information includes that the first service data is the retransmitted data and the second service data is the newly transmitted data, the terminal device may determine that the seventh threshold is the second threshold, or if the retransmission information includes that the first service data is the retransmitted data and the second service data is the retransmitted data, the terminal device may determine that the eighth threshold is the second threshold. For example, the seventh threshold may be greater than or equal to the eighth threshold.

Another consideration principle is that if the first service data is the newly transmitted data, the terminal device may select a smaller threshold as the second threshold, to reserve more time-frequency resources for the second terminal device, or give the terminal device and the second terminal device a same selection opportunity. Certainly, on the premise that the first service data is the newly transmitted data, if the second service data is the retransmitted data, it may be considered to reserve more selection opportunities for the second terminal device, that is, it may be considered to exclude more time-frequency resources. Therefore, if the retransmission information includes that the first service data is the newly transmitted data and the second service data is the newly transmitted data, the terminal device may determine that the ninth threshold is the second threshold; or if the retransmission information includes that the first service data is the newly transmitted data and the second service data is the retransmitted data, the terminal device may determine that the tenth threshold is the second threshold. For example, the ninth threshold may be greater than or equal to the tenth threshold.

For example, after the terminal device determines the number i, a specific threshold used as the second threshold may be independently selected by the terminal device.

Alternatively, in a second implementation of the retransmission information, the second correspondence may include indication information. In this case, the terminal device does not need to independently select the second threshold from the four thresholds indicated by the number i, but may directly determine the second threshold based on the indication information. For example, the number i indicates the four thresholds in the second correspondence. In this case, each of the four thresholds may correspond to the indication information. For example, the seventh threshold in the four thresholds corresponds to first indication information, and the first indication information is used to indicate that the seventh threshold is the second threshold when the first service data is the retransmitted data and the second service data is the newly transmitted data; the eighth threshold in the four thresholds corresponds to second indication information, and the second indication information is used to indicate that the eighth threshold is the second threshold when the first service data is the retransmitted data and the second service data is the retransmitted data; the ninth threshold in the four thresholds corresponds to third indication information, and the third indication information is used to indicate that the ninth threshold is the second threshold when the first service data is the newly transmitted data and the second service data is the newly transmitted data; and the tenth threshold in the four thresholds corresponds to fourth indication information, and the fourth indication information is used to indicate that the tenth threshold is the second threshold when the first service data is the newly transmitted data and the second service data is the retransmitted data. For example, when the retransmission information includes that the first service data is the retransmitted data and the second service data is the newly transmitted data, the terminal device may determine that the seventh threshold is the second threshold, so that the second correspondence is indicated more clearly.

If Condition 10 is that the distance is less than or equal to the first threshold $Th'_{prioTX,prioRX,Re_{TX},Re_{RX}}$, or the RSRP obtained through measurement is greater than the second threshold $Th_{prioTX,prioRX,Re_{TX},Re_{RX}}$, a time-frequency resource that meets either of the two conditions is excluded, and therefore the terminal device may exclude a large quantity of time-frequency resources. In this case, if the terminal device does not have sufficient time-frequency resources for selection due to excessive resources excluded by the terminal device, Condition 10 may be changed to that the distance is less than or equal to the first threshold $Th'_{prioTX,prioRX,Re_{TX},Re_{RX}}$, and the RSRP obtained through measurement is greater than the second threshold $Th_{prioTX,prioRX,Re_{TX},Re_{RX}}$, that is, a time-frequency resource that needs to meet both the two conditions is excluded, and therefore a quantity of time-frequency resources that can be excluded by the terminal device is reduced, and sufficient selectable time-frequency resources are provided for the terminal device as much as possible.

Alternatively, regardless of whether Condition 10 is that the distance is less than or equal to the first threshold $Th'_{prioTX,prioRX,Re_{TX},Re_{RX}}$, or the RSRP obtained through measurement is greater than the second threshold $Th_{prioTX,prioRX,Re_{TX},Re_{RX}}$; or the distance is less than or equal to the first threshold $Th'_{prioTX,prioRX,Re_{TX},Re_{RX}}$, and the RSRP obtained through measurement is greater than the second threshold $Th_{prioTX,prioRX,Re_{TX},Re_{RX}}$, if the terminal device excludes excessive time-frequency resources, a quantity of time-frequency resources excluded by the terminal device may alternatively be reduced in a manner of changing the threshold. For example, a value of the first threshold $Th'_{prioTX,prioRX,Re_{TX},Re_{RX}}$ may be increased, or a value of the second threshold $Th_{prioTX,prioRX,Re_{TX},Re_{RX}}$ may be increased; or a value of the first threshold $Th'_{prioTX,prioTX,Re_{TX},Re_{RX}}$ may be increased, and a value of the second threshold $Th_{prioTX,prioRX,Re_{TX},Re_{RX}}$ may be increased. This is not specifically limited.

Condition 11: The terminal device determines a first time unit set based on the periodicity of the second service data, where a time unit in the first time unit set is the time unit on the to-be-excluded resource. It may be understood that when Condition 9 is met, the terminal device may determine the first time unit set based on Condition 11, and then determine, based on Condition 10, a frequency domain resource (for example, a first frequency domain resource or a second frequency domain resource) that needs to be excluded, so that the terminal device can determine that a time-frequency resource including the first time unit set and the first frequency domain resource is the unavailable time-frequency resource.

A time unit y in the first time unit set may satisfy Formula 2. For Formula 2, refer to the foregoing descriptions.

The second terminal device needs to send the second service data. If the second service data is periodic, the second terminal device reserves a time-frequency resource to send the second service data. Therefore, the second exclusion principle is to exclude the time-frequency resource reserved by the second terminal device for sending the second service data. Certainly, an exclusion condition is that the distance between the terminal device and the second terminal device is less than or equal to the first threshold. If the terminal device does not exclude the time-frequency resource used by the second terminal device, the two terminal devices may select a same time-frequency resource to send the service data. However, when the two terminal devices are close to each other, if the two terminal devices send the service data on the same time-frequency resource, severe interference exists between the two terminal devices, and transmission between the two terminal devices is affected. Consequently, transmission quality is poor. Therefore, in this embodiment of this application, if the two terminal devices are close to each other, one terminal device may exclude the time-frequency resource selected by the other terminal device, to reduce transmission interference and improve transmission quality of the terminal device.

In some scenarios, for example, although the terminal device 1 and the terminal device 2 are close to each other, the two terminal devices may not move for a long time, or a fixed obstacle exists between the two terminal devices for a long time. In this case, the terminal device 1 may not exclude a resource reserved by the terminal device 2, to increase a resource selection range of the terminal device 1. In these scenarios, in the second implementation of the second exclusion principle, screening may be performed based on the RSRP in addition to the distance. For example, when both the two screening conditions are met, a corresponding time-frequency resource may be excluded as the unavailable time-frequency resource, so that a resource selection range of the terminal device can be increased, and transmission efficiency can be improved.

In the third implementation of the second exclusion principle, the time-frequency resource may be excluded based on the distance between the terminal devices, the RSRP, and the retransmission status, so that a probability of a resource collision caused by excluding the resource based on only the RSRP can be reduced, and transmission quality of the terminal device can be improved. For example, if the first service data of the terminal device is the retransmitted data, the terminal device may exclude a small quantity of time-frequency resources, to reserve sufficient time-frequency resources for selection to transmit the first service data, so that the first service data can be transmitted in a timely manner as much as possible, and transmission efficiency of retransmitted data can be improved.

S84: The terminal device selects a first time-frequency resource from available time-frequency resources in the first resource pool to transmit the first service data, where the available time-frequency resource includes a time-frequency resource remaining when the unavailable time-frequency resource is removed from the first resource pool.

After excluding the unavailable time-frequency resource from the first resource pool, the terminal device may select the first time-frequency resource from remaining available time-frequency resources in the first resource pool, to send the first service data. The first time-frequency resource may be a periodic time-frequency resource, or the first time-frequency resource may be an aperiodic time-frequency resource.

S85: The terminal device sends the first service data on the first time-frequency resource.

After selecting the first time-frequency resource, the terminal device may send the first service data on the first time-frequency resource, so that a receive end of the first service data may receive the first service data from the terminal device. The receive end of the first service data is, for example, another terminal device, and the another terminal device may be the foregoing second terminal device, or may be another terminal device. It should be noted that there is no correspondence between the "first time-frequency resource" and the "first frequency domain resource", that is, the "first frequency domain resource" is a frequency domain resource occupied by the second service data, but is not a frequency domain resource corresponding to the first time-frequency resource.

In this embodiment of this application, the terminal device may exclude the time-frequency resource based on the distance between the terminal device and the another terminal device, and may further exclude the time-frequency resource based on a factor such as the RSRP or the retransmission information, so that the excluded time-frequency resource is more accurate, and a case in which some time-frequency resources that need to be excluded are not excluded can be avoided as much as possible, to reduce a resource collision probability.

The following describes, with reference to the accompanying drawings, apparatuses configured to implement the foregoing methods in the embodiments of this application. Therefore, all the foregoing content may be used in subsequent embodiments, and repeated content is not described again.

Figure 9:
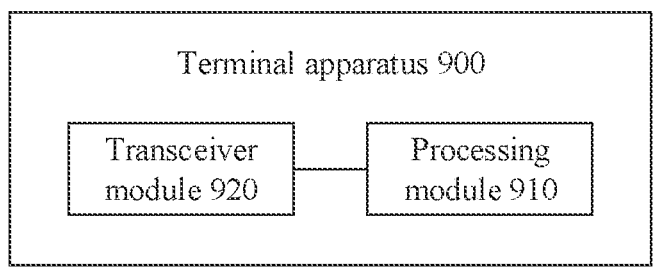
FIG. 9 is a schematic block diagram of a terminal apparatus according to an embodiment of this application.

FIG. 9 is a schematic block diagram of a communications apparatus 900 according to an embodiment of this application. For example, the communications apparatus 900 is a terminal apparatus 900.

The terminal apparatus 900 includes a processing module 910 and a transceiver module 920. For example, the terminal apparatus 900 may be a terminal device, or may be a chip applied to the terminal device, or another combined device, a component, or the like that has functions of the terminal device. When the terminal apparatus is the terminal device, the transceiver module 920 may be a transceiver, and may include an antenna, a radio frequency circuit, and the like; and the processing module 910 may be a processor, for example, a baseband processor. The baseband processor may include one or more central processing units (central processing units, CPUs). When the terminal apparatus is the component having the function of the terminal device, the transceiver module 920 may be a radio frequency unit, and the processing module 910 may be a processor, for example, a baseband processor. When the terminal apparatus is the chip system, the transceiver module 920 may be an input/output interface of the chip system (for example, a baseband chip), and the processing module may be a processor of the chip system, and may include one or more central processing units.

The processing module 910 may be configured to perform all operations performed by the terminal device in the embodiment shown in FIG. 8 except the receiving and sending operations, for example, S81 and S82, and/or configured to support another process of the technology described in this specification. The transceiver module 920 may be configured to perform all the receiving and sending operations performed by the terminal device in the embodiment shown in FIG. 8, for example, S83, and/or configured to support another process of the technology described in this specification.

The processing module 910 is configured to determine a first resource pool, where a time-frequency resource in the first resource pool is available for transmitting at least one of sidelink service data, sidelink control information, and sidelink feedback information.

The transceiver module 920 is configured to detect control information of a second terminal apparatus, where the control information of the second terminal apparatus is used to indicate second service data of the second terminal apparatus, and the control information of the second terminal apparatus includes location information of the second terminal apparatus, a first frequency domain resource occupied by the second service data, and a periodicity of the second service data.

The processing module 910 is further configured to determine an unavailable time-frequency resource in the first resource pool based on location information of the terminal apparatus 900, the location information of the second terminal apparatus, a first threshold, the first frequency domain resource, and the periodicity of the second service data.

The processing module 910 is further configured to select a first time-frequency resource from available time-frequency resources in the first resource pool to transmit first service data, where the available time-frequency resource includes a time-frequency resource remaining when the unavailable time-frequency resource is removed from the first resource pool.

The transceiver module 920 is further configured to send the first service data on the first time-frequency resource.

In an optional implementation, the processing module 910 is configured to determine the unavailable time-frequency resource in the first resource pool based on the location information of the terminal apparatus 900, the location information of the second terminal apparatus, the first frequency domain resource, and the periodicity of the second service data in the following manners:
  determining a distance between the terminal apparatus 900 and the second terminal apparatus based on the location information of the terminal apparatus 900 and the location information of the second terminal apparatus;
  determining that the distance between the terminal apparatus 900 and the second terminal apparatus is less than or equal to the first threshold, or that the distance between the terminal apparatus 900 and the second terminal apparatus is less than or equal to the first threshold, and reference signal received power obtained by the terminal apparatus 900 through measurement based on the control information is greater than a second threshold, where the control information indicates a resource location of a reference signal corresponding to the reference signal received power; and
  determining the unavailable time-frequency resource based on the periodicity of the second service data and the first frequency domain resource.

In an optional implementation, that the transceiver module 920 is configured to detect control information of a second terminal apparatus includes:
  detect the control information of the second terminal apparatus within first duration before a time point at which the first service data arrives.

In an optional implementation,
  the processing module 910 is further configured to determine that the first threshold is a predefined value; or
  the transceiver module 920 is further configured to receive first signaling from a network device, where the first signaling is used to indicate the first threshold.

In an optional implementation, the control information includes a priority of the second service data; and the processing module 910 is further configured to determine the first threshold based on a priority of the first service data and the priority of the second service data.

In an optional implementation, the processing module 910 is configured to determine the first threshold based on the priority of the first service data and the priority of the second service data in the following manners:
  determining a number h based on the priority of the first service data and the priority of the second service data; and
  determining, based on a first correspondence, that a threshold corresponding to the number h is the first threshold, where the first correspondence is a correspondence between a number and a threshold.

In an optional implementation,
  the first correspondence is configured by using signaling; or
  the first correspondence is predefined.

In an optional implementation, the processing module 910 is configured to determine, based on the first correspondence in the following manners, that the threshold corresponding to the number h is the first threshold:
  determining, based on retransmission information, the first threshold from two thresholds corresponding to the number h, where the retransmission information includes whether the first service data is retransmitted data, and the two thresholds corresponding to the number h include a third threshold and a fourth threshold; and
  when the retransmission information includes that the first service data is the retransmitted data, determining that the third threshold is the first threshold, or when the retransmission information includes that the first service data is newly transmitted data, determining that the fourth threshold is the first threshold, where the third threshold is less than the fourth threshold.

In an optional implementation, the processing module 910 is configured to determine, based on the first correspondence in the following manner, that the threshold corresponding to the number h is the first threshold:
  determining, based on retransmission information, that one of four thresholds corresponding to the number h in the first correspondence is the first threshold, where the retransmission information includes whether the first service data is retransmitted data and whether the second service data is retransmitted data.

In an optional implementation, the processing module 910 is configured to determine, based on the retransmission information in the following manners, that one of the four thresholds corresponding to the number h in the first correspondence is the first threshold:
  if the retransmission information includes that the first service data is the retransmitted data and the second service data is newly transmitted data, determining that a third threshold in two thresholds corresponding to the number h in the first correspondence is the first threshold;
  if the retransmission information includes that the first service data is the retransmitted data and the second service data is the retransmitted data, determining that a fourth threshold in two thresholds corresponding to the number h in the first correspondence is the first threshold;
  if the retransmission information includes that the first service data is newly transmitted data and the second service data is newly transmitted data, determining that a fifth threshold in two thresholds corresponding to the number h in the first correspondence is the first threshold; or
  if the retransmission information includes that the first service data is newly transmitted data and the second service data is the retransmitted data, determining that a sixth threshold in two thresholds corresponding to the number h in the first correspondence is the first threshold, where a value relationship between the third threshold, the fourth threshold, the fifth threshold, and the sixth threshold is: the third threshold<the fourth threshold<the fifth threshold<the sixth threshold, the third threshold the fourth threshold<the fifth threshold<the sixth threshold, or the third threshold<the fourth threshold<the fifth threshold=the sixth threshold.

In an optional implementation, the control information includes the priority of the second service data; and the processing module 910 is further configured to determine the second threshold based on the priority of the first service data and the priority of the second service data.

In an optional implementation, the processing module 910 is configured to determine the second threshold based on the priority of the first service data and the priority of the second service data in the following manners:

determining a number i based on the priority of the first service data and the priority of the second service data; and determining, based on a second correspondence, that a threshold corresponding to the number i is the second threshold, where the second correspondence is a correspondence between a number and a threshold.

In an optional implementation, the second correspondence is configured by using signaling; or the second correspondence is predefined.

In an optional implementation, the processing module 910 is configured to determine, based on the second correspondence in the following manners, that the threshold corresponding to the number i is the second threshold:

determining, based on the retransmission information, the second threshold from two thresholds corresponding to the number i, where the retransmission information includes whether the first service data is the retransmitted data, and the two thresholds corresponding to the number h include a seventh threshold and an eighth threshold; and when the retransmission information includes that the first service data is the retransmitted data, determining that the seventh threshold is the second threshold, or when the retransmission information includes that the first service data is the newly transmitted data, determining that the eighth threshold is the second threshold, where the seventh threshold is greater than the eighth threshold.

In an optional implementation, the processing module 910 is configured to determine, based on the second correspondence in the following manner, that the threshold corresponding to the number i is the second threshold:

determining, based on the retransmission information, that one of four thresholds corresponding to the number i in the second correspondence is the second threshold, where the retransmission information includes whether the first service data is the retransmitted data.

In an optional implementation, the processing module 910 is configured to determine, based on the retransmission information in the following manners, that one of the four thresholds corresponding to the number i in the second correspondence is the second threshold:

if the retransmission information includes that the first service data is the retransmitted data and the second service data is the newly transmitted data, determining that a seventh threshold in two thresholds corresponding to the number i in the first correspondence is the first threshold;

if the retransmission information includes that the first service data is the retransmitted data and the second service data is the retransmitted data, determining that an eighth threshold in two thresholds corresponding to the number i in the first correspondence is the second threshold;

if the retransmission information includes that the first service data is the newly transmitted data and the second service data is the newly transmitted data, determining that a ninth threshold in two thresholds corresponding to the number i in the first correspondence is the second threshold; or if the retransmission information includes that the first service data is the newly transmitted data and the second service data is the retransmitted data, determining that a tenth threshold in two thresholds corresponding to the number i in the first correspondence is the second threshold, where a value relationship between the seventh threshold, the eighth threshold, the ninth threshold, and the tenth threshold is: the seventh threshold>the eighth threshold>the ninth threshold>the tenth threshold, the seventh threshold=the eighth threshold>the ninth threshold>the tenth threshold, or the seventh threshold>the eighth threshold>the ninth threshold=the tenth threshold.

In an optional implementation, the processing module 910 is configured to determine the unavailable time-frequency resource based on the periodicity of the second service data and the first frequency domain resource in the following manners:

determining a first time unit set based on the periodicity of the second service data, where a time unit in the first time unit set is a time unit on a to-be-excluded resource, and the time unit is a symbol or a slot; and determining that a time-frequency resource including the first time unit set and the first frequency domain resource is the unavailable time-frequency resource, where a time unit y in the first time unit set satisfies the following formula:

$$y + j \times [S_{symbol} \times P_{rsvp\_TX}/N_{symbol}] = m + q[S_{symbol} \times P_{rxvp\_RX}/N_{symbol}],$$

where y represents an index of the time unit y, or represents a time domain location of the time unit y; m represents a number of a first time unit in the first resource pool, and the first time unit is a time unit in which the first terminal apparatus receives the control information; j=0, 1, 2, . . . , and $C_{resel}-1$, and $C_{resel}$ represents a quantity of periods corresponding to a time-frequency resource reserved by the first terminal apparatus for the first service data, for example, $C_{resel}=10$ if the terminal apparatus reserves time-frequency resources in 10 periods; $P_{rsvp\_TX}$ represents a periodicity of the first service data; $N_{symbol}$ represents a quantity of time units included in one frame structure configuration period; $S_{symbol}$ represents a quantity of time units that are available for transmitting sidelink service data in one frame structure period; $P_{rxvp\_RX}$ represents the periodicity of the second service data; and q=1, 2, . . . , and Q, where if $$\left(\frac{P_{rxvp_{RX}}}{N_{symbol}}\right)/K < 1 \text{ and } n' - m \le [S_{symbol} \times P_{rxvp\_RX}/N_{symbol}],$$

$$Q = K/\left[\frac{P_{rxvp_{RX}}}{N_{symbol}}\right]; \text{ otherwise, } Q = 1,$$

where K is a preconfigured value, or is a value indicated by using higher layer signaling; [ ] represents rounding up or rounding down; and if a second time unit belongs to the first resource pool, n' is a number of the second time unit in the first resource pool, or if a second time unit does not belong to the first resource pool, n' is a number of a $1^{st}$ time unit that belongs to the first resource pool after the second time unit, where the second time unit is a time unit in which the first service data arrives.

In an optional implementation, the unavailable time-frequency resource further includes a time-frequency resource reserved by the terminal apparatus 900 for third service data sent by the terminal apparatus 900, and a sending time of the third service data is within the first duration before the time point at which the first service data arrives.

It should be understood that the processing module 910 in this embodiment of this application may be implemented by a processor or a processor-related circuit component, and the transceiver module 920 may be implemented by a transceiver or a transceiver-related circuit component.

Figure 10:
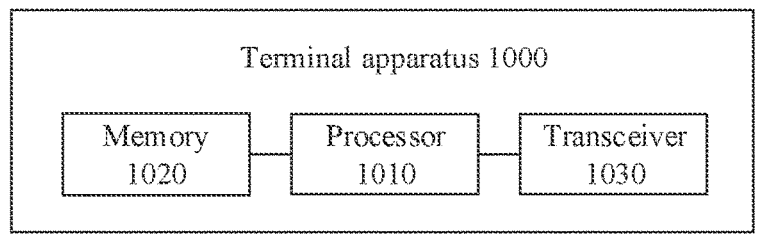
FIG. 10 is another schematic block diagram of a terminal apparatus according to an embodiment of this application.

As shown in FIG. 10, an embodiment of this application further provides a communications apparatus 1000. For example, the communications apparatus 1000 is a terminal apparatus 1000. For example, the terminal apparatus 1000 may be a communications device, for example, a terminal device or a chip system. The terminal apparatus 1000 includes a processor 1010, a memory 1020, and a transceiver 1030. The memory 1020 stores instructions or programs. The processor 1010 is configured to execute the instructions or the programs stored in the memory 1020. When the instructions or the programs stored in the memory 1020 are executed, the processor 1010 is configured to perform the operation performed by the processing module 1010 in the foregoing embodiment, and the transceiver 1030 is configured to perform the operation performed by the transceiver module 920 in the foregoing embodiment.

It should be understood that the terminal apparatus 900 or the terminal apparatus 1000 in the embodiments of this application may correspond to the terminal device in the embodiment shown in FIG. 8, and operations and/or functions of the modules in the terminal apparatus 900 or the terminal apparatus 1000 are intended to implement corresponding procedures in the embodiment shown in FIG. 8. For brevity, details are not described herein again.

An embodiment of this application further provides a communications apparatus. The communications apparatus may be a terminal device or a circuit. The communications apparatus may be configured to perform an action performed by the terminal device in the foregoing method embodiment shown in FIG. 8.

Figure 11:
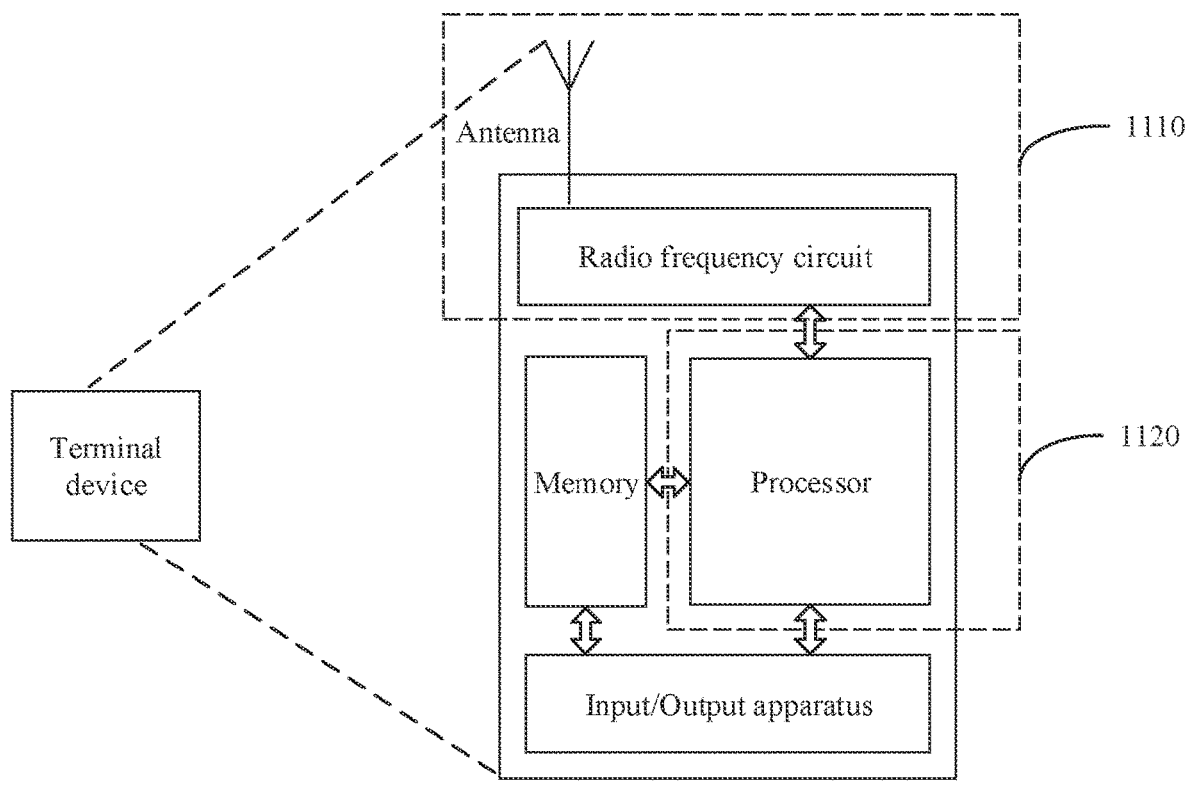
FIG. 11 is a schematic block diagram of a communications apparatus according to an embodiment of this application.

When the communications apparatus is a terminal device, FIG. 11 is a simplified schematic structural diagram of the terminal device. As shown in FIG. 11, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, for example, a touchscreen, a display screen, or a keyboard, is mainly configured to: receive data entered by a user, and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. An actual terminal device product may include one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit may sometimes also be referred to as a transmitter, a transmitter circuit, or the like.

It should be understood that the transceiver unit 1110 is configured to perform the sending operation and the receiving operation on the terminal device side in the method embodiment shown in FIG. 8, and the processing unit 1120 is configured to perform an operation other than the receiving operation and the sending operation on the terminal device side in the method embodiment shown in FIG. 8.

For example, in an implementation, the transceiver unit 1110 is configured to perform the receiving and sending steps on the terminal device side in the embodiment shown in FIG. 8, for example, S83. The processing unit 1120 is configured to perform the operation other than the receiving and sending operations on the terminal device side in the embodiment shown in FIG. 8, for example, S81 and S82.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 12:
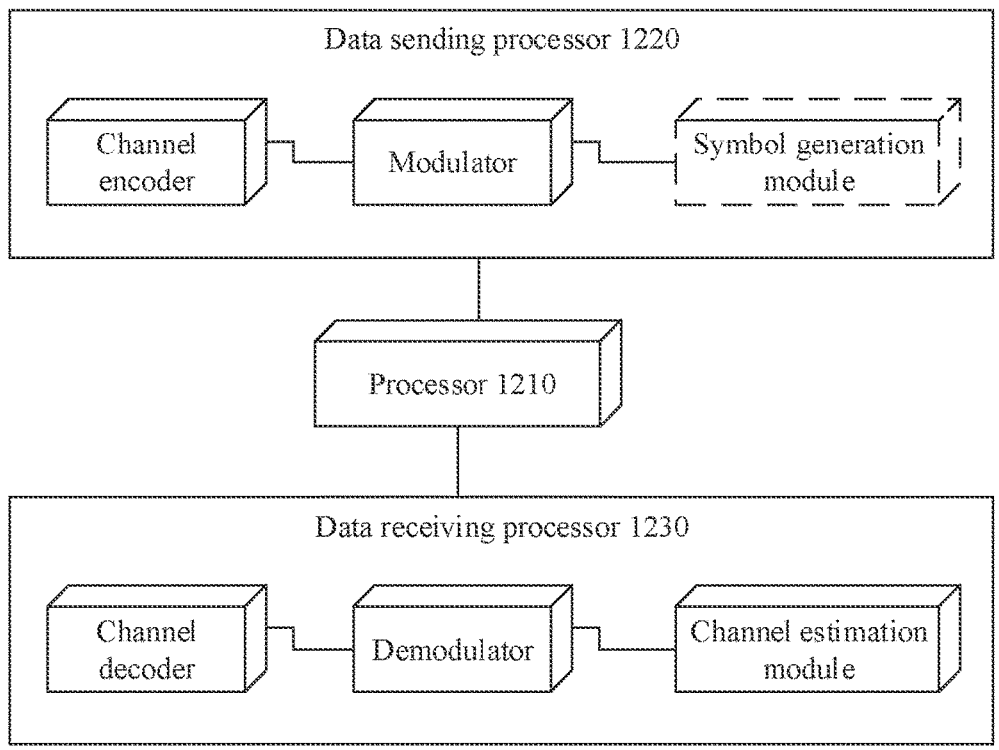
FIG. 12 is another schematic block diagram of a communications apparatus according to an embodiment of this application.

When the communications apparatus in this embodiment of this application is the terminal device, reference may be made to a device shown in FIG. 12. In an example, the device may implement functions similar to those of the processor 1010 in FIG. 10. In FIG. 12, the device includes a processor 1210, a data sending processor 1220, and a data receiving processor 1230. The processing module 910 in the foregoing embodiment may be the processor 1210 in FIG. 12, and implements a corresponding function. The transceiver module 920 in the foregoing embodiment may be the data sending processor 1220 and/or the data receiving processor 1230 in FIG. 12.

Although FIG. 12 shows a channel encoder and a channel decoder, it may be understood that the modules are merely examples, and do not constitute a limitation on this embodiment.

Figure 13:
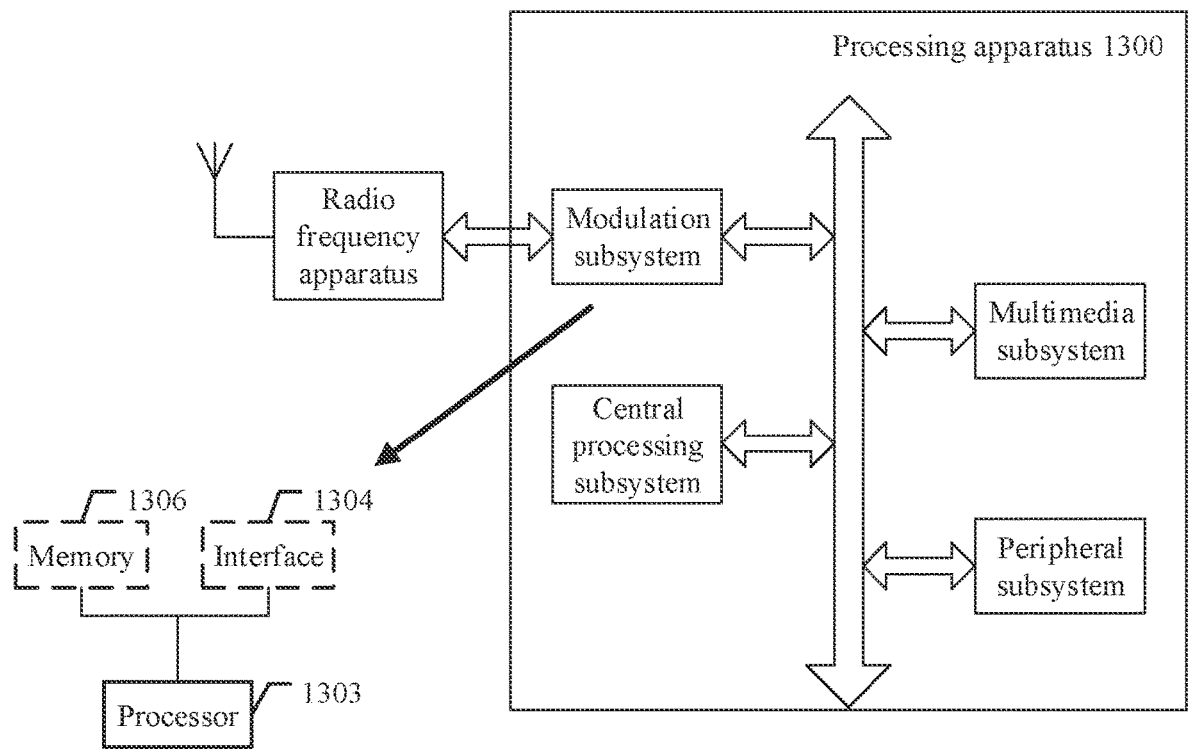
FIG. 13 is still another schematic block diagram of a communications apparatus according to an embodiment of this application.

FIG. 13 shows another form of this embodiment. A processing apparatus 1300 includes modules such as a modulation subsystem, a central processing subsystem, and a peripheral subsystem. The communications apparatus in this embodiment may be used as the modulation subsystem in the processing apparatus. Specifically, the modulation subsystem may include a processor 1303 and an interface 1304. The processor 1303 implements functions of the processing module 910, and the interface 1304 implements functions of the transceiver module 920. In another variation, the modulation subsystem includes a memory 1306, a processor 1303, and a program that is stored in the memory 1306 and that can be run on the processor. When executing the program, the processor 1303 implements the method on the terminal device side in the foregoing method embodiment shown in FIG. 8, It should be noted that the memory 1306 may be a nonvolatile memory or a volatile memory. The memory 1306 may be located in the modulation subsystem, or may be located in the processing apparatus 1300, provided that the memory 1306 can be connected to the processor 1303.

An embodiment of this application further provides a computer-readable storage medium. The computer-readable storage medium stores a computer program. When the program is executed by a processor, a procedure related to the terminal device in the embodiment shown in FIG. 8 provided in the foregoing method embodiments may be implemented.

An embodiment of this application further provides a computer program product including instructions. When the instructions are executed, the method on the terminal device side in the method embodiment shown in FIG. 8 is performed.

It should be understood that, the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units, algorithms, and steps in the examples described with reference to the embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one location, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A communications method, comprising:
    determining, by a first terminal apparatus, a first resource pool, wherein a time-frequency resource in the first resource pool is available for transmitting at least one of sidelink service data, sidelink control information, or sidelink feedback information;
    detecting, by the first terminal apparatus, control information of a second terminal apparatus, wherein the control information of the second terminal apparatus indicates second service data of the second terminal apparatus, and the control information of the second terminal apparatus comprises location information of the second terminal apparatus, a first frequency domain resource occupied by the second service data, and a periodicity of the second service data;
    determining, by the first terminal apparatus, an unavailable time-frequency resource in the first resource pool based on location information of the first terminal apparatus, the location information of the second terminal apparatus, a first threshold, the first frequency domain resource, and the periodicity of the second service data;
    selecting, by the first terminal apparatus, a first time-frequency resource from available time-frequency resources in the first resource pool to transmit first service data, wherein the available time-frequency resource comprises a time-frequency resource remaining when the unavailable time-frequency resource is removed from the first resource pool; and
    sending, by the first terminal apparatus, the first service data on the first time-frequency resource.

2. The method according to claim 1, wherein the determining, by the first terminal apparatus, an unavailable time-frequency resource in the first resource pool based on location information of the first terminal apparatus, the location information of the second terminal apparatus, the first frequency domain resource, and the periodicity of the second service data comprises:
    determining, by the first terminal apparatus, a distance between the first terminal apparatus and the second terminal apparatus based on the location information of the first terminal apparatus and the location information of the second terminal apparatus;
    determining, by the first terminal apparatus, that the distance between the first terminal apparatus and the second terminal apparatus is less than or equal to the first threshold, wherein the control information indicates a resource location of a reference signal corresponding to the reference signal received power; and
    determining, by the first terminal apparatus, the unavailable time-frequency resource based on the periodicity of the second service data and the first frequency domain resource.

3. The method according to claim 1, wherein the detecting, by the first terminal apparatus, control information of a second terminal apparatus comprises:
    detecting, by the first terminal apparatus, the control information of the second terminal apparatus within first duration before a time point at which the first service data arrives.

4. The method according to claim 2, wherein the method further comprises:
    determining, by the first terminal apparatus, that the first threshold is a predefined value; or
    receiving, by the first terminal apparatus, first signaling from a network device, wherein the first signaling indicates the first threshold.

5. The method according to claim 2, wherein the control information comprises a priority of the second service data; and the method further comprises:
    determining, by the first terminal apparatus, the first threshold based on a priority of the first service data and the priority of the second service data.

6. The method according to claim 5, wherein the determining, by the first terminal apparatus, the first threshold based on a priority of the first service data and the priority of the second service data comprises:
    determining, by the first terminal apparatus, a number h based on the priority of the first service data and the priority of the second service data; and
    determining, by the first terminal apparatus based on a first correspondence, that a threshold corresponding to the number h is the first threshold, wherein the first correspondence is a correspondence between a number and a threshold.

7. The method according to claim 6, wherein
    the first correspondence is configured by using signaling; or
    the first correspondence is predefined.

8. The method according to claim 6, wherein the determining, by the first terminal apparatus based on a first correspondence, that a threshold corresponding to the number h is the first threshold comprises:
- determining, by the first terminal apparatus based on retransmission information, the first threshold from two thresholds corresponding to the number h, wherein the retransmission information comprises whether the first service data is retransmitted data, and the two thresholds corresponding to the number h comprise a third threshold and a fourth threshold; and
- when the retransmission information comprises that the first service data is the retransmitted data, determining, by the first terminal apparatus, that the third threshold is the first threshold, or when the retransmission information comprises that the first service data is newly transmitted data, determining, by the first terminal apparatus, that the fourth threshold is the first threshold, wherein the third threshold is less than the fourth threshold.

9. The method according to claim 6, wherein the determining, by the first terminal apparatus based on a first correspondence, that a threshold corresponding to the number h is the first threshold comprises:
- determining, by the first terminal apparatus based on retransmission information, that one of four thresholds corresponding to the number h in the first correspondence is the first threshold, wherein the retransmission information comprises whether the first service data is retransmitted data and whether the second service data is retransmitted data.

10. The method according to claim 9, wherein the determining, by the first terminal apparatus based on retransmission information, that one of four thresholds corresponding to the number h in the first correspondence is the first threshold comprises:
- if the retransmission information comprises that the first service data is the retransmitted data and the second service data is newly transmitted data, determining, by the first terminal apparatus, that a third threshold in four thresholds corresponding to the number h in the first correspondence is the first threshold;
- if the retransmission information comprises that the first service data is the retransmitted data and the second service data is the retransmitted data, determining, by the first terminal apparatus, that a fourth threshold in four thresholds corresponding to the number h in the first correspondence is the first threshold;
- if the retransmission information comprises that the first service data is newly transmitted data and the second service data is newly transmitted data, determining, by the first terminal apparatus, that a fifth threshold in four thresholds corresponding to the number h in the first correspondence is the first threshold; or
- if the retransmission information comprises that the first service data is newly transmitted data and the second service data is the retransmitted data, determining, by the first terminal apparatus, that a sixth threshold in four thresholds corresponding to the number h in the first correspondence is the first threshold, wherein
- a value relationship between the third threshold, the fourth threshold, the fifth threshold, and the sixth threshold is: the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold.

11. A terminal apparatus, comprising:
- at least one processor; and
- one or more memories coupled to the at least one processor and storing programming instructions for execution by the at least one processor to:
- determine a first resource pool, wherein a time-frequency resource in the first resource pool is available for transmitting at least one of sidelink service data, sidelink control information, or sidelink feedback information; and
- detect control information of a second terminal apparatus, wherein the control information of the second terminal apparatus indicates second service data of the second terminal apparatus, and the control information of the second terminal apparatus comprises location information of the second terminal apparatus, a first frequency domain resource occupied by the second service data, and a periodicity of the second service data, wherein
- determine an unavailable time-frequency resource in the first resource pool based on location information of the terminal apparatus, the location information of the second terminal apparatus, a first threshold, the first frequency domain resource, and the periodicity of the second service data;
- select a first time-frequency resource from available time-frequency resources in the first resource pool to transmit first service data, wherein the available time-frequency resource comprises a time-frequency resource remaining when the unavailable time-frequency resource is removed from the first resource pool; and
- send the first service data on the first time-frequency resource.

12. The terminal apparatus according to claim 11, wherein the one or more memories store programming instructions for execution by the at least one processor to determine the unavailable time-frequency resource in the first resource pool based on the location information of the terminal apparatus, the location information of the second terminal apparatus, the first frequency domain resource, and the periodicity of the second service data in the following manners:
- determining a distance between the terminal apparatus and the second terminal apparatus based on the location information of the terminal apparatus and the location information of the second terminal apparatus;
- determining that the distance between the terminal apparatus and the second terminal apparatus is less than or equal to the first threshold, wherein the control information indicates a resource location of a reference signal corresponding to the reference signal received power; and
- determining the unavailable time-frequency resource based on the periodicity of the second service data and the first frequency domain resource.

13. The terminal apparatus according to claim 11, wherein the one or more memories store programming instructions for execution by the at least one processor to:
- detect the control information of the second terminal apparatus within first duration before a time point at which the first service data arrives.

14. The terminal apparatus according to claim 12, wherein the one or more memories further store programming instructions for execution by the at least one processor to:
- determine that the first threshold is a predefined value; or receive first signaling from a network device, wherein the first signaling indicates the first threshold.

15. The terminal apparatus according to claim 12, wherein the control information comprises a priority of the second service data; and the one or more memories store programming instructions for execution by the at least one processor to determine the first threshold based on a priority of the first service data and the priority of the second service data.

16. The terminal apparatus according to claim 15, wherein the one or more memories store programming instructions for execution by the at least one processor to:
determine a number h based on the priority of the first service data and the priority of the second service data; and
determine, based on a first correspondence, that a threshold corresponding to the number h is the first threshold, wherein the first correspondence is a correspondence between a number and a threshold.

17. The terminal apparatus according to claim 16, wherein the first correspondence is configured by using signaling; or
the first correspondence is predefined.

18. The terminal apparatus according to claim 16, wherein the one or more memories store programming instructions for execution by the at least one processor to:
determine, based on retransmission information, the first threshold from two thresholds corresponding to the number h, wherein the retransmission information comprises whether the first service data is retransmitted data, and the two thresholds corresponding to the number h comprise a third threshold and a fourth threshold; and
when the retransmission information comprises that the first service data is the retransmitted data, determine that the third threshold is the first threshold, or when the retransmission information comprises that the first service data is newly transmitted data, determine that the fourth threshold is the first threshold, wherein the third threshold is less than the fourth threshold.

19. The terminal apparatus according to claim 17, wherein the one or more memories store programming instructions for execution by the at least one processor to:
determine, based on retransmission information, that one of four thresholds corresponding to the number h in the first correspondence is the first threshold, wherein the retransmission information comprises whether the first service data is retransmitted data and whether the second service data is retransmitted data.

20. The terminal apparatus according to claim 19, wherein the one or more memories store programming instructions for execution by the at least one processor to:
if the retransmission information comprises that the first service data is the retransmitted data and the second service data is newly transmitted data, determine that a third threshold in two thresholds corresponding to the number h in the first correspondence is the first threshold;
if the retransmission information comprises that the first service data is the retransmitted data and the second service data is the retransmitted data, determine that a fourth threshold in two thresholds corresponding to the number h in the first correspondence is the first threshold;
if the retransmission information comprises that the first service data is newly transmitted data and the second service data is newly transmitted data, determine that a fifth threshold in two thresholds corresponding to the number h in the first correspondence is the first threshold; or
if the retransmission information comprises that the first service data is newly transmitted data and the second service data is the retransmitted data, determine that a sixth threshold in two thresholds corresponding to the number h in the first correspondence is the first threshold, wherein
a value relationship between the third threshold, the fourth threshold, the fifth threshold, and the sixth threshold is: the third threshold<the fourth threshold<the fifth threshold<the sixth threshold, the third threshold=the fourth threshold<the fifth threshold<the sixth threshold, or the third threshold<the fourth threshold<the fifth threshold=the sixth threshold.

* * * * *

UNITED STATES PATENT AND TRADEMARK OFFICE
CERTIFICATE OF CORRECTION

| | |
|---|---|
| PATENT NO. | : 12,022,441 B2 |
| APPLICATION NO. | : 17/535280 |
| DATED | : June 25, 2024 |
| INVENTOR(S) | : Lei Dong, Jinfang Zhang and Lei Lu |

It is certified that error appears in the above-identified patent and that said Letters Patent is hereby corrected as shown below:

In the Specification

In Column 1, in Line 7 (Approx.), Delete "PCT/CN20201083841," and insert -- PCT/CN2020/083841, --.

Signed and Sealed this
Fifth Day of November, 2024

Katherine Kelly Vidal
Director of the United States Patent and Trademark Office